United States Patent
Liu et al.

(10) Patent No.: US 11,700,610 B2
(45) Date of Patent: Jul. 11, 2023

(54) LAYER ONE SIDELINK CHANNEL STATE INFORMATION REPORTING

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Ozcan Ozturk, San Diego, CA (US); Rajat Prakash, San Diego, CA (US); Sony Akkarakaran, Poway, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/177,559

(22) Filed: Feb. 17, 2021

(65) Prior Publication Data

US 2022/0264557 A1    Aug. 18, 2022

(51) Int. Cl.
*H04W 72/00*    (2023.01)
*H04W 72/21*    (2023.01)
*H04L 5/00*    (2006.01)

(52) U.S. Cl.
CPC ........... *H04W 72/21* (2023.01); *H04L 5/0048* (2013.01)

(58) Field of Classification Search
None
See application file for complete search history.

(56) References Cited

U.S. PATENT DOCUMENTS

| 10,708,028 | B2* | 7/2020 | Nam | H04W 72/0446 |
| 11,496,878 | B2* | 11/2022 | Wu | H04W 8/005 |
| 11,528,742 | B2* | 12/2022 | Joseph | H04L 5/0053 |
| 2013/0329664 | A1* | 12/2013 | Kim | H04W 24/10 370/329 |
| 2014/0254523 | A1* | 9/2014 | Chai | H04W 76/14 370/329 |
| 2015/0200762 | A1* | 7/2015 | Kim | H04W 52/146 370/329 |

(Continued)

FOREIGN PATENT DOCUMENTS

| WO | WO-2020012540 A1 | 1/2020 |
| WO | WO-2020220910 A1 | 11/2020 |

OTHER PUBLICATIONS

International Search Report and Written Opinion—PCT/US2022/012983—ISA/EPO—dated May 6, 2022.

*Primary Examiner* — Hassan A Phillips
*Assistant Examiner* — Gautam Sharma
(74) *Attorney, Agent, or Firm* — Holland & Hart LLP

(57) ABSTRACT

Methods, systems, and devices for wireless communications are described. A first user equipment (UE) may receive control signaling comprising an indication of a format for a channel state information report indicating channel state information for a sidelink channel between the first UE and a second UE. The first UE may determine the channel state information for the sidelink channel between the first UE and the second UE. The first UE may configure a layer one uplink control message to indicate the channel state information report according to the format. The first UE may transmit, based at least in part on the format, the layer one uplink control message to a base station indicating the channel state information report.

30 Claims, 17 Drawing Sheets

(56) References Cited

U.S. PATENT DOCUMENTS

| | | | |
|---|---|---|---|
| 2017/0289869 A1* | 10/2017 | Nogami | H04L 5/0094 |
| 2018/0006788 A1* | 1/2018 | Lee | H04L 5/001 |
| 2018/0019844 A1* | 1/2018 | Nogami | H04L 5/0055 |
| 2020/0022089 A1* | 1/2020 | Guo | H04W 52/242 |
| 2020/0084006 A1 | 3/2020 | Rahman et al. | |
| 2020/0162228 A1 | 5/2020 | Gao et al. | |
| 2020/0336253 A1* | 10/2020 | He | H04W 4/40 |
| 2021/0028842 A1* | 1/2021 | Kim | H04B 7/0628 |
| 2021/0045074 A1 | 2/2021 | Manolakos et al. | |
| 2021/0050888 A1* | 2/2021 | Manolakos | H04B 7/088 |
| 2021/0050953 A1* | 2/2021 | Park | H04L 5/0094 |
| 2021/0091878 A1* | 3/2021 | Taherzadeh Boroujeni | H04W 52/228 |
| 2021/0099265 A1* | 4/2021 | Shin | H04L 5/0051 |
| 2021/0194557 A1* | 6/2021 | Wang | H04L 5/0055 |
| 2021/0282098 A1* | 9/2021 | Luo | H04W 76/11 |
| 2021/0314974 A1* | 10/2021 | Miao | H04W 72/1263 |
| 2021/0391907 A1* | 12/2021 | Wang | H04B 7/0632 |
| 2022/0094499 A1* | 3/2022 | Wang | H04B 7/0639 |
| 2022/0201528 A1* | 6/2022 | Shin | H04W 24/10 |
| 2022/0225143 A1* | 7/2022 | Sun | H04W 72/14 |
| 2022/0264557 A1* | 8/2022 | Liu | H04L 5/0094 |

* cited by examiner

LAYER ONE SIDELINK CHANNEL STATE INFORMATION REPORTING

FIELD OF TECHNOLOGY

The following relates to wireless communications, including layer one sidelink channel state information reporting.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support layer one sidelink channel state information reporting. Generally, the described techniques provide various mechanisms that support wireless communications in a wireless network. Broadly, aspects of the described techniques support various mechanisms that improve, for a sidelink channel, channel state information (CSI) reporting via uplink control information (UCI) signaling. For example, a sidelink user equipment (UE) may be configured to provide CSI reports for the sidelink channel (e.g., the channel between sidelink UEs, such as a sidelink channel using a PC5 interface) via a layer one (L1) UCI message. For example, the base station may configure the UE with an indication of the format for the UCI message conveying the CSI report. The base station may then trigger the CSI report from the receiving sidelink UE as well as CSI reference signal (CSI-RS) transmissions from the transmitting sidelink UE. The base station may provide the CSI report format configuration and/or trigger directly to the respective UE or may tunnel this information through the transmitting sidelink UE to the receiving sidelink UE. The receiving UE may measure the CSI-RS transmitted from the transmitting sidelink UE and report the CSI to the base station according to the report format indicated by the base station.

A method for wireless communication at a first UE is described. The method may include receiving control signaling including an indication of a format for a CSI report indicating CSI for a sidelink channel between the first UE and a second UE, determining the CSI for the sidelink channel between the first UE and the second UE, configuring a layer one uplink control message to indicate the CSI report according to the format, and transmitting, based on the format, the layer one uplink control message to a base station indicating the CSI report.

An apparatus for wireless communication at a first UE is described. The apparatus may include a processor, memory coupled with the processor, and instructions stored in the memory. The instructions may be executable by the processor to cause the apparatus to receive control signaling including an indication of a format for a CSI report indicating CSI for a sidelink channel between the first UE and a second UE, determine the CSI for the sidelink channel between the first UE and the second UE, configure a layer one uplink control message to indicate the CSI report according to the format, and transmit, based on the format, the layer one uplink control message to a base station indicating the CSI report.

Another apparatus for wireless communication at a first UE is described. The apparatus may include means for receiving control signaling including an indication of a format for a CSI report indicating CSI for a sidelink channel between the first UE and a second UE, means for determining the CSI for the sidelink channel between the first UE and the second UE, means for configuring a layer one uplink control message to indicate the CSI report according to the format, and means for transmitting, based on the format, the layer one uplink control message to a base station indicating the CSI report.

A non-transitory computer-readable medium storing code for wireless communication at a first UE is described. The code may include instructions executable by a processor to receive control signaling including an indication of a format for a CSI report indicating CSI for a sidelink channel between the first UE and a second UE, determine the CSI for the sidelink channel between the first UE and the second UE, configure a layer one uplink control message to indicate the CSI report according to the format, and transmit, based on the format, the layer one uplink control message to a base station indicating the CSI report.

Some examples of the method, apparatuses, and non-transitory computer-readable medium described herein may further include operations, features, means, or instructions for determining, based on the control signaling, that the format includes a uU configured format for the CSI report, the uU configured format including at least one of an identifier associated with the second UE, a subchannel index associated with the sidelink channel between the first UE and the second UE, a CSI quantity associated with the CSI, or combinations thereof.

Some examples of the method, apparatuses, and non-transitory computer-readable medium described herein may further include operations, features, means, or instructions for identifying, based on the control signaling, sidelink resources, uU resources, or both, allocated to the second UE for reference signal transmissions and monitoring for transmissions of the reference signal from the second UE using the sidelink resources, the uU resources, or both, where determining the CSI may be based on the monitoring.

Some examples of the method, apparatuses, and non-transitory computer-readable medium described herein may further include operations, features, means, or instructions for receiving a trigger signal from the second UE triggering reference signal transmissions, where the trigger signal indicates a cell identifier associated with the base station and the CSI may be determined based on the trigger signal.

Some examples of the method, apparatuses, and non-transitory computer-readable medium described herein may further include operations, features, means, or instructions for determining CSI for each sidelink channel between the first UE and a corresponding set of multiple second UEs, where the layer one uplink control message indicates the CSI for each sidelink channel.

Some examples of the method, apparatuses, and non-transitory computer-readable medium described herein may further include operations, features, means, or instructions for receiving a request from the base station triggering the CSI report.

Some examples of the method, apparatuses, and non-transitory computer-readable medium described herein may further include operations, features, means, or instructions for transmitting, based on the request, a layer two message to the second UE triggering reference signal transmissions, where the CSI may be determined based on the reference signal transmissions.

Some examples of the method, apparatuses, and non-transitory computer-readable medium described herein may further include operations, features, means, or instructions for receiving, from the base station, a DCI message over a uU channel between the first UE and the base station indicating the request.

Some examples of the method, apparatuses, and non-transitory computer-readable medium described herein may further include operations, features, means, or instructions for receiving, from the second UE relayed from the base station, a DCI over the sidelink channel between the first UE and the base station indicating the request.

Some examples of the method, apparatuses, and non-transitory computer-readable medium described herein may further include operations, features, means, or instructions for compiling one or more instances of CSI for the sidelink channel between the first UE and the second UE, where the layer one uplink control message includes the one or more instances of CSI.

Some examples of the method, apparatuses, and non-transitory computer-readable medium described herein may further include operations, features, means, or instructions for receiving a separate request for each instance of the CSI for the sidelink channel and transmitting, according to each separate request, a separate layer one uplink control message indicating the requested CSI.

Some examples of the method, apparatuses, and non-transitory computer-readable medium described herein may further include operations, features, means, or instructions for receiving a common request for each instance of the CSI for the sidelink channel and transmitting, according to the common request, one layer one uplink control message indicating the one or more instances of CSI.

In some examples of the method, apparatuses, and non-transitory computer-readable medium described herein, the layer one uplink control message includes an uplink control information message carried over a physical uplink control channel (PUCCH) message, a physical uplink shared channel (PUSCH) message, or both.

A method for wireless communication at a base station is described. The method may include transmitting, to a first UE, control signaling including an indication of a format for a CSI report indicating CSI for a sidelink channel between the first UE and a second UE, receiving, based on the format, a layer one uplink control message from the first UE indicating the CSI report, and determining the CSI for the sidelink channel between the first UE and the second UE based on the CSI report.

An apparatus for wireless communication at a base station is described. The apparatus may include a processor, memory coupled with the processor, and instructions stored in the memory. The instructions may be executable by the processor to cause the apparatus to transmit, to a first UE, control signaling including an indication of a format for a CSI report indicating CSI for a sidelink channel between the first UE and a second UE, receive, based on the format, a layer one uplink control message from the first UE indicating the CSI report, and determine the CSI for the sidelink channel between the first UE and the second UE based on the CSI report.

Another apparatus for wireless communication at a base station is described. The apparatus may include means for transmitting, to a first UE, control signaling including an indication of a format for a CSI report indicating CSI for a sidelink channel between the first UE and a second UE, means for receiving, based on the format, a layer one uplink control message from the first UE indicating the CSI report, and means for determining the CSI for the sidelink channel between the first UE and the second UE based on the CSI report.

A non-transitory computer-readable medium storing code for wireless communication at a base station is described. The code may include instructions executable by a processor to transmit, to a first UE, control signaling including an indication of a format for a CSI report indicating CSI for a sidelink channel between the first UE and a second UE, receive, based on the format, a layer one uplink control message from the first UE indicating the CSI report, and determine the CSI for the sidelink channel between the first UE and the second UE based on the CSI report.

Some examples of the method, apparatuses, and non-transitory computer-readable medium described herein may further include operations, features, means, or instructions for configuring the control signaling to indicate the format including a uU configured format for the CSI report, the uU configured format including at least one of an identifier associated with the second UE, a subchannel index associated with the sidelink channel between the first UE and the second UE, a CSI quantity associated with the CSI, or combinations thereof.

Some examples of the method, apparatuses, and non-transitory computer-readable medium described herein may further include operations, features, means, or instructions for configuring the control signaling to indicate sidelink resources, uU resources, or both, allocated to the second UE for reference signal transmissions, where the second UE performs transmissions of the reference signal using the sidelink resources, the uU resources, or both.

Some examples of the method, apparatuses, and non-transitory computer-readable medium described herein may further include operations, features, means, or instructions for transmitting a trigger signal to the second UE triggering reference signal transmissions, where the trigger signal indicates a cell identifier associated with the base station and the CSI may be based on the trigger signal.

Some examples of the method, apparatuses, and non-transitory computer-readable medium described herein may further include operations, features, means, or instructions for determining, based on the layer one uplink control message, the CSI for each sidelink channel between the first UE and a corresponding set of multiple second UEs, where the layer one uplink control message indicates the CSI for each sidelink channel.

Some examples of the method, apparatuses, and non-transitory computer-readable medium described herein may further include operations, features, means, or instructions for transmitting a request triggering the CSI report.

Some examples of the method, apparatuses, and non-transitory computer-readable medium described herein may further include operations, features, means, or instructions for transmitting, to the first UE, a DCI message over a uU channel between the first UE and the base station indicating the request.

Some examples of the method, apparatuses, and non-transitory computer-readable medium described herein may further include operations, features, means, or instructions for identifying, based on the layer one uplink control message, one or more instances of CSI for the sidelink channel between the first UE and the second UE.

Some examples of the method, apparatuses, and non-transitory computer-readable medium described herein may further include operations, features, means, or instructions for transmitting a separate request for each instance of the CSI for the sidelink channel and receiving, according to each separate request, a separate layer one uplink control message indicating the requested CSI.

Some examples of the method, apparatuses, and non-transitory computer-readable medium described herein may further include operations, features, means, or instructions for transmitting a common request for each instance of the CSI for the sidelink channel and receiving, according to the common request, one layer one uplink control message indicating the one or more instances of CSI.

In some examples of the method, apparatuses, and non-transitory computer-readable medium described herein, the layer one uplink control message includes an uplink control information message carried over a PUCCH message, an PUSCH message, or both.

DETAILED DESCRIPTION

Some wireless communications supporting sidelink communications between user equipment (UE) may operate in a mode one configuration where a base station controls, monitors, or otherwise manages aspects of sidelink communications between the UE. For example, the base station may allocate various time/frequency/spatial resources for sidelink communications between the UE. To support intelligent allocation decisions, it may be beneficial for the base station to have an understanding of the channel conditions (e.g., channel state information (CSI)) between the UE. Conventional techniques permit the receiving UE to use medium access control (MAC) control element (CE) signaling to indicate a CSI report to the base station. However, this approach relies on layer two signaling, which may introduce additional time for processing, response preparation, etc. For example, the timeline associated with using MAC CE signaling may be extensive enough that it may introduce excessive latency into the sidelink communications. This may result in some sidelink communications (e.g., such as high priority inter-vehicle based sidelink communications including safety information, sensor data, etc.) failing to satisfy a corresponding latency requirement.

Aspects of the disclosure are initially described in the context of wireless communication systems. Generally, the described techniques provide various mechanisms that support wireless communications in a wireless network. Broadly, aspects of the described techniques support various mechanisms that improve, for a sidelink channel, CSI reporting via an uplink message such as uplink control information (UCI) signaling. For example, a sidelink UE may be configured to provide CSI reports for the sidelink channel (e.g., the channel between sidelink UEs, such as a sidelink channel using a PC5 interface) via a layer one (L1) signaling such as a L1 UCI message. For example, the base station may configure the UE with an indication of the format for the UCI message conveying the CSI report. The base station may then trigger the CSI report from the receiving sidelink UE as well as CSI reference signal (CSI-RS) transmissions from the transmitting sidelink UE. The base station may provide the CSI report format configuration and/or trigger directly to the respective UE or may tunnel this information through the transmitting sidelink UE to the receiving sidelink UE. The receiving UE may measure the CSI-RS transmitted from the transmitting sidelink UE and report the CSI to the base station according to the report format indicated by the base station.

Aspects of the disclosure are further illustrated by and described with reference to apparatus diagrams, system diagrams, and flowcharts that relate to layer one sidelink CSI reporting.

Figure 1:
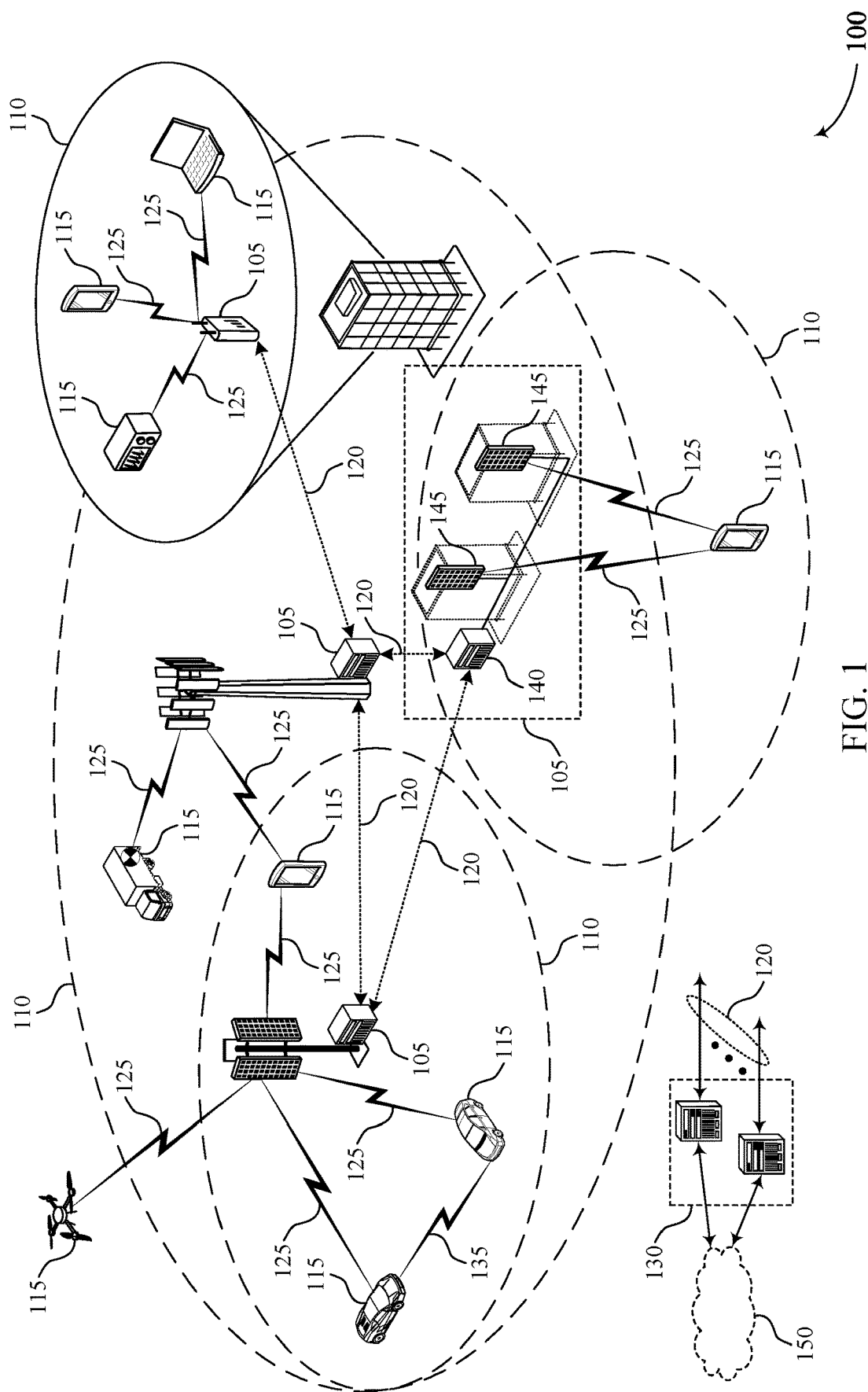
FIG. 1 illustrates an example of a wireless communication system that supports layer one sidelink channel state information (CSI) reporting in accordance with aspects of the present disclosure.

FIG. 1 illustrates an example of a wireless communication system 100 that supports layer one sidelink CSI reporting in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a first UE performing sidelink communications with a second UE) may receive control signaling comprising an indication of a format for a CSI report indicating CSI for a sidelink channel between the first UE and a second UE. The UE 115 may determine the CSI for the sidelink channel between the first UE and the second UE. The UE 115 may configure a layer one uplink control message to indicate the CSI report according to the format. The UE 115 may transmit, based at least in part on the format, the layer one uplink control message to a base station indicating the CSI report.

A base station 105 may transmit, to a first UE, control signaling comprising an indication of a format for a CSI report indicating CSI for a sidelink channel between the first UE and a second UE. The base station 105 may receive, based at least in part on the format, a layer one uplink control message from the first UE indicating the CSI report. The base station 105 may determine the CSI for the sidelink channel between the first UE and the second UE based at least in part on the CSI report.

Figure 2:
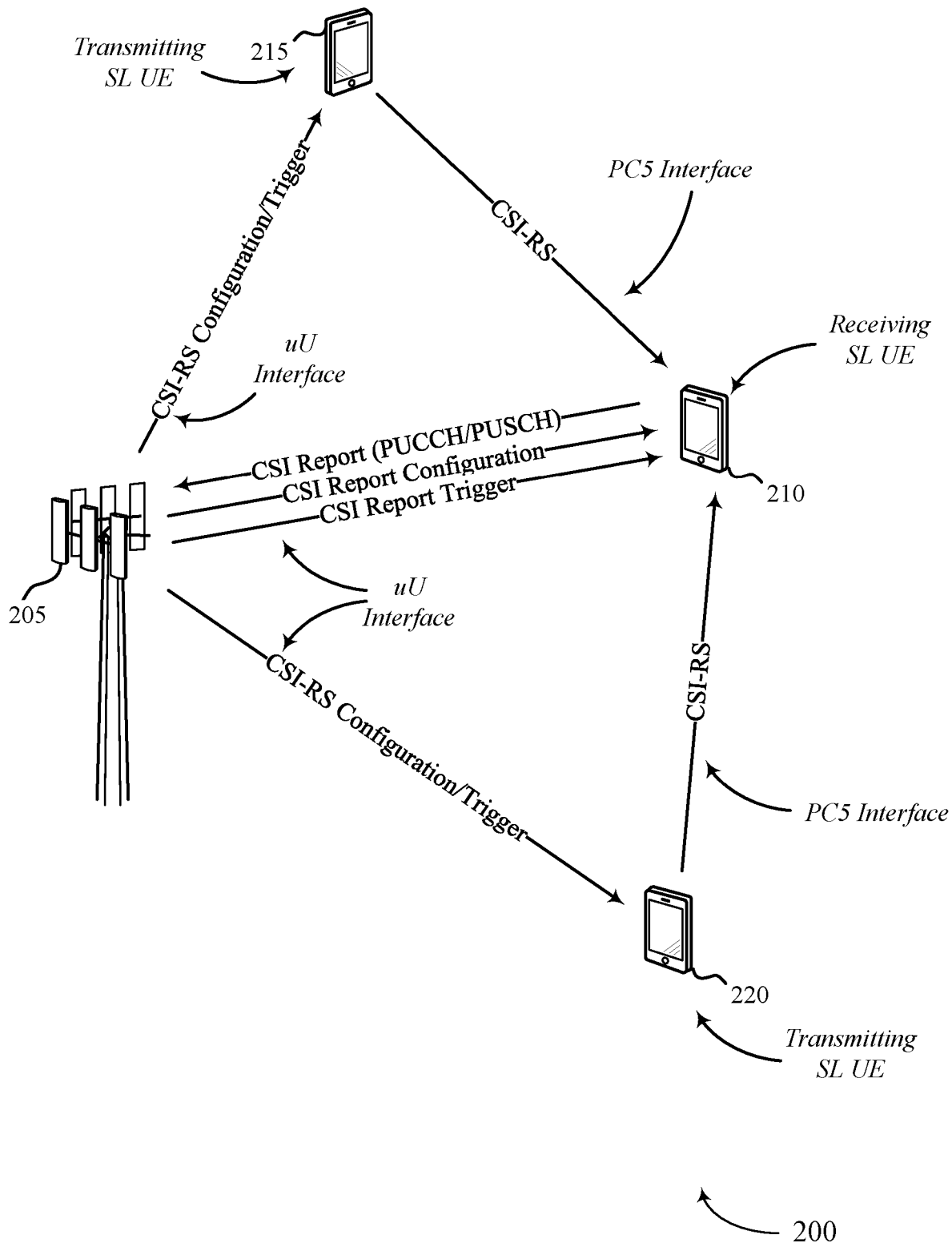
FIG. 2 illustrates an example of a wireless communication system that supports layer one sidelink CSI reporting in accordance with aspects of the present disclosure.

FIG. 2 illustrates an example of a wireless communication system 200 that supports layer one sidelink channel state information reporting in accordance with aspects of the present disclosure. Wireless communication system 200 may implement aspects of wireless communication system 100. Wireless communication system 200 may include base station 205, UE 210, UE 215, and UE 220, which may be examples of the corresponding devices described herein.

UE 210, UE 215, and/or UE 220 may be performing wireless communications via a sidelink channel (e.g., using a PC5 interface). The sidelink communications may be performed, in some examples, according to a mode one configuration where base station 205 monitors, controls, or otherwise manages aspects of sidelink communications between UE 210, UE 215, and UE 220. For example, base station 205 may identify, schedule, or otherwise allocate resources (e.g., time, frequency, spatial, code, etc., resources) for sidelink communications between the UE. In some examples, this may include base station 205 picking a lowest starting subchannel, as well as the number of subchannels, to be used for an initial sidelink transmission and for one or more (e.g., up to two) retransmissions of the sidelink communications. The UE, in this example, may adapt the MCS according to a MAC control element (CE) based aperiodic CSI report, which may include a rank indicator (RI) (e.g., using one bit) and a CSI (e.g., using four bits).

However, in some situations the sidelink traffic may be bursty traffic, which means that the CSI for the sidelink channel between the transmitting sidelink (SL) UE (e.g., either of UE 215 and/or UE 220, in this non-limiting example) and the receiving SL UE (e.g., UE 210 in this non-limiting example) may be important to support such throughput. Some wireless communication systems may be configured such that base station 205 may indicate a destination address (e.g., index) in a DCI when scheduling resources for a sidelink transmission (e.g., based on a buffer status report (BSR) and/or as reported in RRC signaling) to provide the dynamic grant or configured grant type 1 and/or type 2. This may allow improved control of the resource management by base station 205 and may be more suited to certain traffic types (e.g., eMBB traffic). Accordingly, this allows base station 205 to control which receiving SL UE that each transmission (e.g., packet) goes to, even though the packet is originating from the transmitting SL UE.

In some examples, wireless communication system 200 may, in whole or in part, be operating according to a NR-U SL configuration. In this scenario, the subchannels may be spread across a 100 MHz BWP, where the BWP may be divided into five 20 MHz listen-before-talk (LBT) channels. Each 20 MHz LBT channel may be experiencing different interference levels (e.g., due to WiFi channelization). The frequency diversity provided by using such a wideband channel may be substantial or may otherwise necessitate knowledge of the channel state for sidelink communications using such a configuration.

In some wireless communication systems, base station 205 operating in mode one may not know CSI information for the sidelink channel, which may negatively impact or otherwise limit the ability of base station 205 to make informed scheduling decisions for the sidelink communications. For example, base station 205 may signal the resources for the sidelink communications to the transmitting SL UE, but do so without an understanding of the CSI for the sidelink channel from the receiving SL UE perspective. Such per-subchannel allocation, without the RI and CQI, may result in difficulty for base station 205 to maximize the spectral efficiency. Instead, base station 205 may make conservative estimates over the frequency resources needed for the transport block (TB).

In some wireless communication systems, CSI reporting from the receiving SL UE may be provided using MAC CE signaling. For example, in some situations the receiving SL UE may transmit a MAC CE to base station 205 indicating the CSI report. In other situations, the receiving SL UE may relay the CSI report via the transmitting SL UE. Accordingly, both approaches rely on a layer two MAC CE transmission, which increases the latency of the sidelink communications. That is, layer two MAC CE transmissions may introduce additional time to prepare and transmit the MAC CE signaling, for the receiving SL UE to receive the transmission and pass the MAC CE signaling up to layer two, and then process and respond to the MAC CE signaling. In some situations, such increased timing delays associated with layer two MAC CE signaling may introduce extensive latency into the sidelink communications. Such increased latency may, in some situations, result in some sidelink traffic types failing to satisfy latency requirements. In additional to disrupting/delaying such sidelink communications, such techniques may result in critical safety information being conveyed in the sidelink communications being delayed or lost (e.g., inter-vehicle communications via the sidelink channel indicating sensor data, important safety information, etc.).

Accordingly, aspects of the described techniques provide various mechanisms where the receiving SL UE (e.g., UE 210 in this example) provides CSI reporting via an uplink control message (e.g., UCI) carried over PUCCH and/or PUSCH. Broadly, this may include the transmitting SL UE(s) (e.g., UE 215 and/or UE 220 in this example) and the receiving SL UE (e.g., UE 210 in this example) being within the coverage area of base station 205. Base station 205 may know which receiving SL UE that the packet being communicated via the sidelink channel is intended for. Broadly, the described techniques generally provide for the receiving SL UE to report CSI directly back to base station 205 via UCI (e.g., PUCCH and/or PUSCH). Based on the CSI report, base station 205 may make more informed decisions on which resources (subchannel(s)) to choose as well as the number of subchannels needed for a transport block. With a complete and responsive (e.g., timely) CSI report from all receiving SL UEs from different transmitting SL UEs, base station 205 scheduler may make better scheduling decisions across difference transmitting/receiving SL UEs. Implementing layer one sidelink CSI reporting reduces the latency of CSI reporting with respect to MAC CE CSI reporting. In some aspects, a new type of CSI report may be used and defined for the uU interface, as well as new triggering mechanisms.

For example, base station 205 may transmit or otherwise provide a configuration signal (e.g., using RRC signaling) to UE 210 (e.g., a first UE, which is the receiving SL UE in this example) that configures, identifies, or otherwise indicates a format for the CSI report from the receiving SL UE. The CSI report may be for CSI for a sidelink channel (e.g., a PC5 interface) between the receiving SL UE (e.g., the first UE) and one or more transmitting SL UE(s) (e.g., second UE, third UE, etc., which may correspond to UE 215 and UE 220, respectively, in this example). For example, the control signaling may indicate that the format is for a uU configured format for the CSI report. The uU configured format may include an identifier of the transmitting SL UE(s), a subchannel index associated with the sidelink channel(s), a CSI quantity associated with the CSI, and the like. UE 210 (e.g., the first UE, which is the receiving SL UE in this example, may determine the CSI for the sidelink channel and transmit a CSI report to base station 205 configured according to the CSI report format.

For example, aspects of the described techniques may include defining a new uU CSI report format that is associated with (e.g., indicates) the sidelink CSI-RS, the transmitting SL UE(s) identifier(s), subchannel indices, etc., as well as a new CSI quantity. In some aspects, the CSI report format may be used for aperiodic sidelink CSI reporting over the uU interface. For example, conventional sidelink techniques may only support subband-based aperiodic CSI-RS. In some aspects, there may be an association in the CSI report format with the sidelink CSI-RS. For example, the new uU CSI report configuration (CSI-reportConfig) may be associated with the CSI-RS resource configuration (CSI-ResourceConfig), which points to (e.g., is configured for) a CSI-RS resource set in the PC5 interface in the same cell. That is, in some examples the receiving SL UE may compute the CSI report(s) for the CSI-RS received from transmitting SL UE(s) in the same cell. In the non-limiting example illustrated in FIG. 2, this may include UE 210 providing CSI reports based on CSI-RS transmissions from UE 215 and UE 220, which are located within the coverage area of base station 205.

In some aspects, the new uU CSI report format may support jumbo (e.g., uU and PC5) CSI reporting where both uU and PC5 CSI-RS resource set(s) are indicated. For example, base station 205 and/or UE 210 may identify, based on the configuration signaling, sidelink resources and/or uU resources allocated to the transmitting SL UE(s) (e.g., UE 215 and/or UE 220) for reference signal transmissions (e.g., CSI-RS transmissions). In this situation, UE 210 (e.g., the first UE, which is the receiving SL UE in this example) may monitor for the reference signal transmissions (e.g. CSI-RS transmission) via the sidelink resources and/or uU resources. Accordingly, UE 210 may determine the CSI information for the uU and/or sidelink channel(s) associated with UE 215 and/or UE 220.

As discussed, in some examples the CSI report format may be associated with the identifier(s) of the transmitting SL UE(s). This may support multiple CSI reports being provided for different PC5 connected transmitting SL UE(s). UE 210 may include the transmitting SL UE's identifier in each CSI report (e.g., CSI-ReportConfig) to distinguish different CSI from different transmitting SL UEs. For example, UE 210 may receive aperiodic CSI-RS transmissions from UE 215 and UE 220. UE 210 may then compute, calculate, or otherwise prepare two CSI reports for UE 215 and UE 220, respectively. Accordingly, in some examples UE 210 may determine CSI for each sidelink channel between UE 210 (e.g., the first UE) and a plurality of second UE (e.g., UE 215 and UE 220, which are the transmitting SL UEs in this example).

As also discussed, in some examples the CSI report format may be associated with subchannel indices. In some aspects, this may include sidelink CSI-RS transmissions being sounded in one or more contiguous subchannels (e.g., in contiguous subchannels which PSSCH occupies). In some examples, the transmitting SL UE(s) may sound different subchannels and resource block sets in different slots.

In some examples the CSI report format may be associated with a new reporting quantity (e.g., a CSI quantity, reportQuantity). For example, the CSI-ReportConfig (e.g., the configuration signaling) may include the sidelink rank indicator (SL RI), the SL RI and the CQI, optionally the SL RI and the uU reportQuantity, optionally the SL RI, CQI, and uU reportQuantity, or any combination thereof. In some aspects, the SL+RI+uU reportQuantity and/or the SL RI+CQI+uU reportQuantity indications may support a jumbo CSI report of both uU and sidelink CSI reporting (e.g., reporting CSI for CSI-RS transmitted using uU and/or sidelink resources). For example, some CSI reporting configuration formats for sidelink CSI reporting may support SL RI+CQI for the sidelink subband.

Aspects of the described technique support sidelink CSI reporting via the uU interface (e.g., using UCI signaling) for a transmitting SL UE and receiving SL UE pair located within the same cell (e.g., within the coverage area of base station 205). This may mean that both the receiving SL UE (e.g., UE 210) and the transmitting SL UE(s) (e.g., UE 215 and UE 220) may both be connected to the same cell via the uU interface. To support this, aspects of the described techniques may include signaling the cell identifier (e.g., any identifier associated with base station 205) from the transmitting SL UE to the receiving SL UE. For example, transmitting SL UE(s) (e.g., UE 215 and/or UE 220) may transmit signaling (e.g., a trigger signal) to the receiving SL UE (e.g., UE 210) that indicates the cell identifier associated with base station 205. The trigger signal, in addition to indicating the cell identifier, may also serve as a trigger indicating that the transmitting SL UE will be performing reference signal transmissions (e.g., CSI-RS transmissions). Examples of the trigger signal include, but are not limited to, the transmitting SL UE indicating the cell identifier in a sidelink control information two (SCI-2) message that carries the CSI request, layer two or higher layer signaling (e.g., MAC CE signaling, RRC signaling, and the like).

Aspects of the described techniques may support jumbo CSI reporting where UE 210 (e.g., the receiving SL UE) provides CSI reports from different transmitting SL UEs. In some example, this may include UE 210 determining the CSI for each sidelink channel between UE 210 and UE 215 and between UE 210 and UE 220 (e.g., a plurality of second UEs, in this example). The layer one uplink control message (e.g., the UCI) may therefore include the indication of the CSI for each sidelink channel. Sending the CSI reports for multiple sidelink channels may reduce control overhead signaling, PUCCH/PUSCH resources, and the like. Accordingly, aspects of the described techniques may support multiple sidelink CSI reports from different transmitting SL UEs in a single UCI. UE 210 may cascade the indications of the sidelink CSI reports from different transmitting SL UEs in the UCI payload.

In some aspects, base station 205 may transmit a CSI trigger to the transmitting SL UE(s) that trigger sidelink CSI-RS transmissions. The sidelink and/or uU CSI-RS resource configuration and trigger signal may be transmitted in a single signal or in separate signals. Moreover, in some examples base station 205 may transmit a request to UE 210 triggering the CSI report. That is, base station 205 may poll the sidelink CSI report in the layer one uplink control message (e.g., UCI) from the receiving SL UE. Base station 205 may pool the sidelink CSI reports in the UCI via the uU interface using a DCI message transmitted to the receiving SL UE and/or may tunnel the uplink grant (e.g., the uU resources for the UCI carrying the UCI) via the transmitting SL UE(s). That is, in some examples UE 210 may receive the DCI message from base station 205 over the uU channel between UE 210 (e.g., the first UE) and base station 205. Additionally, or alternatively, UE 210 may receive the DCI message over the sidelink channel from the transmitting SL UE(s). In some examples, UE 210 may transmit a layer two message (e.g., MAC CE) to the transmitting SL UE(s) (e.g., the UE 215 and/or UE 220) that triggers the reference signal transmissions (e.g., the CSI-RS transmissions). That is, UE 210 may use a MAC CE to configure the transmitting SL UE(s) to include the sidelink trigger state (e.g., CSI-AperiodicTriggerState). Generally, the CSI-AperiodicTriggerState may point toward (e.g., be associated with) the CSI-ReportConfigID (e.g., the identifier associated with the configured CSI report format), which may indicate to the transmitting SL UE(s) which CSI-RS resources (uU and/or SL resources) to use for transmitting the CSI-RS(s). To support feedback of multiple CSI reports from multiple transmitting SL UEs in a single PUCCH/PUSCH CSI report, the trigger state may be linked to multiple CSI report identifiers. For example, a subset of connected transmitting SL UEs may be configured for a trigger state (e.g., the same trigger state).

As discussed, base station 205 may transmit the trigger signal (e.g., the sidelink CSI report trigger) via the DCI message directly to the receiving SL UE (e.g., UE 210). For example, a new CSI trigger state may be included in a DCI 0_x message format (e.g., a CSI trigger) for the receiving SL UE's sidelink CSI report from UE 210 to base station 205. Base station 205 may know when the sidelink CSI report will be ready (e.g., the timeline it takes for UE 210 to prepare the CSI report), and may therefore transmit the polling uplink grant (e.g., the trigger signal triggering the CSI report and indicating the uU resources allocated to the UCI) accordingly.

In some aspects, the sidelink CSI trigger may be tunneled through the transmitting SL UE(s) to the receiving SL UE. That is, instead of transmitting the DCI 0_1 grant directly to the receiving SL UE (e.g., UE 210), base station 205 may tunnel the grant in a DCI format 3_0 message to the transmitting SL UE(s) and the SCI grant from the transmitting SL UE to the receiving SL UE. That is, base station 205 may transmit the DCI message (e.g., using a DCI format 3_0 message) to UE 215 and/or UE 220. In some examples, base station 205 may add the DCI format 0_1 grant for the receiving SL UE to the end of the new jumbo DCI format 3_0 message for the sidelink CSI report trigger. The transmitting SL UE (e.g., UE 215 and/or UE 220, in this example) may then transmit (e.g., relay) the DCI format 0_1 message (e.g., the trigger signal) to the receiving SL UE to trigger the sidelink CSI report. In some examples, this may include the transmitting SL UE(s) including the DCI format 0_1 message (e.g., grant) as part of the payload in an SCI-1 and/or SCI-2 message to serve as the trigger for the sidelink CSI report.

In some examples, base station 205 may not poll the CSI report immediately (e.g., may not trigger transmission of the UCI message immediately upon UE 210 having the CSI report ready). The base station may delay the sidelink CSI report intentionally (e.g., to allow UE 210 to compile multiple CSI reports and then poll them via the same UCI) and/or unintentionally (e.g., base station 205 may fail an LBT procedure, and may therefore not capture the uU channel to transmit the trigger signal). Accordingly, in some examples UE 210 may compile multiple instances of the CSI for the sidelink channel between UE 210 and UE 215 and/or UE 220. This may support the receiving SL UE reporting previously computed sidelink CSI in a single UCI (e.g., the layer one uplink control message) via the triggered PUSCH and/or PUCCH resources).

For example, the receiving SL UE may compute the sidelink CSI from the PC5 CSI-RS when triggered by SCI (e.g., SCI-1 and/or SCI-2 received from transmitting SL UE(s)). The receiving SL UE may store the computed sidelink CSI report and wait for a sidelink CSI report trigger. The computed and stored plurality of sidelink CSI reports may be for a single transmitting SL UE or may be for multiple transmitting SL UEs. The sidelink CSI report for transmitting SL UE(s) stored by the receiving SL UE may be updated as new CSI are computed and/or each computed CSI may be maintained. Base station 205 may trigger the sidelink CSI report from the receiving SL UE by transmitting a DCI message (e.g. DCI message 0_x via the uU interface to the receiving SL UE and/or using a tunneled DCI 3_0 format message to the transmitting SL UE that is tunneled or otherwise relayed to the receiving SL UE via SCI over the PC5 interface). UE 210 (e.g., the receiving SL UE) may transmit the sidelink CSI report in UCI (e.g., the layer one uplink control message) via PUCCH and/or PUSCH, e.g., when a DCI triggered PUCCH is supported. Accordingly, the UCI messages indicating the CSI report may carry or otherwise convey the compiled one or more CSI for the transmitting SL UE(s).

In some aspects, the receiving SL UE may transmit the compiled CSI report via UCI indicating CSI for multiple transmitting SL UEs in various manners. One example may include, but is not limited to, the transmitting SL UE to receive multiple sidelink CSI triggers and report multiple UCIs for different CSI reports for different transmitting SL UEs. That is, in this example each trigger signal may be associated with a single CSI report. For example, if UE 210 has MCSI reports for M transmitting SL UEs, MDCI triggers may be used, which trigger M CSI reports sent independently over M PUSCH/PUCCH UCI messages. Although the overhead for this example may be based on the number M (e.g., a positive integer), this approach may provide increased control over the CSI reporting process. Accordingly, in some examples UE 210 may receive a separate request for each instance of the CSI for the sidelink channel. In response to each request, UE 210 may transmit separate layer one uplink messages (e.g., UCI) indicating the requested CSI.

In another example, multiple CSI reports from different or the same transmitting SL UEs may be jointly encoded in a UCI message and share the same DCI trigger. This approach may conserve CRC overhead, reduce the CSI reporting timeline, and the like. Accordingly, this may include UE 210 receiving a common request (e.g., the single DCI trigger) for each instance of the CSI for the sidelink channel. In response to the common request, UE 210 may transmit a single layer one message uplink control message to base station 210 indicating the instances of the CSI (e.g., the plurality of CSI). As discussed above, the layer one uplink control message may be a UCI message transmitted via PUCCH and/or PUSCH.

Figure 3A:
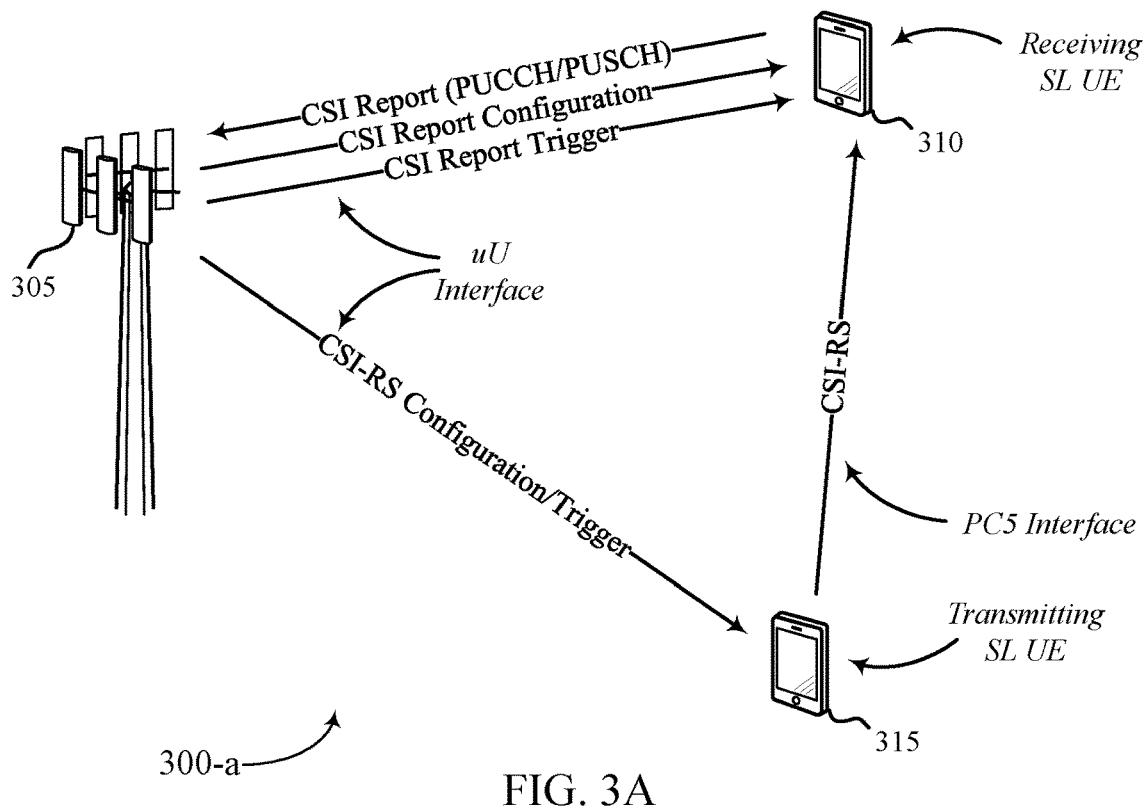
FIGS. 3A and 3B illustrate an example of a wireless communication system that supports layer one sidelink CSI reporting in accordance with aspects of the present disclosure.
Figure 3B:
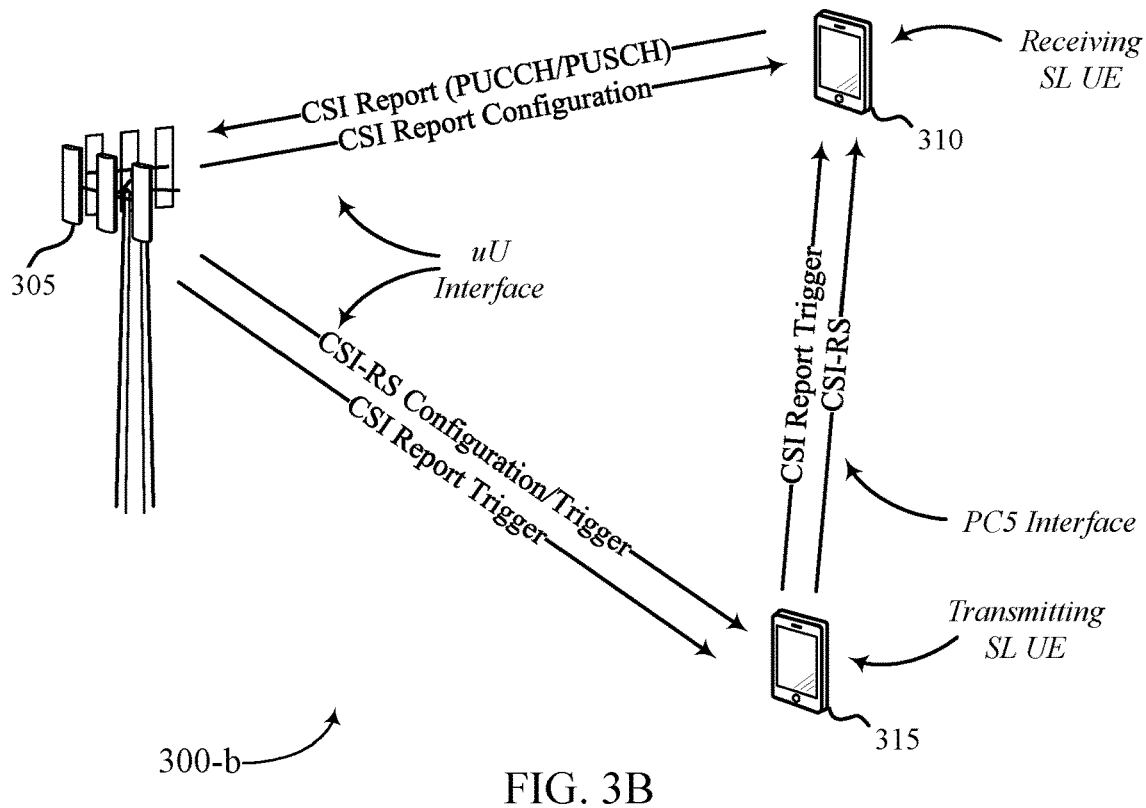

FIGS. 3A and 3B illustrate an example of a wireless communication system 300 that supports layer one sidelink CSI reporting in accordance with aspects of the present disclosure. Wireless communication system 300 may implement aspects of wireless communication systems 100 and/or 200. Wireless communication system 300 may include base station 305, UE 310, and/or UE 315, which may be examples of the corresponding devices described herein. In some aspects, UE 310 may be an example of a receiving SL UE and UE 315 may be an example of a transmitting SL UE. Wireless communication system 300-a of FIG. 3A illustrates an example where base station 305 transmits a CSI trigger request directly to UE 310 and wireless communication system 300-b of FIG. 3B illustrates an example where base station 305 transmits the CSI trigger request to UE 310 by tunneling the request through UE 315 to UE 310.

As discussed above, aspects of the described techniques provide various mechanisms where a receiving SL UE (e.g., UE 310) transmits sidelink CSI report(s) indicating CSI for the sidelink channel between the receiving SL UE and transmitting SL UE(s) (e.g., UE 315 in this example) to base station 305 via a layer one uplink control message (e.g., UCI message carried via PUCCH and/or PUSCH).

For example, base station 305 may transmit or otherwise provide control signaling to UE 310 (e.g., a first UE, which is the receiving SL UE in this example). The control signal may generally identify or otherwise indicate a format for a CSI Report indicating CSI for the sidelink channel between UE 310 and UE 315 (e.g., a second UE, which is the transmitting SL UE in this example). UE 310 may determine the CSI for the sidelink channel based on reference signal transmissions (e.g., CSI-RS transmissions) from UE 315. UE 310 may configure the layer one uplink control message according to the format indicated in the control signal (e.g., using a UCI format) and transmit the layer one uplink control message to base station 305 indicating the CSI report.

In some aspects, base station 305 may transmit a request to UE 310 triggering the CSI report. That is, base station 305 may poll the sidelink CSI report in the layer one uplink control message (e.g., UCI) from the receiving SL UE. Base station 305 may pool the sidelink CSI reports in the UCI via the uU interface using a DCI message transmitted to the receiving SL UE and/or may tunnel the uplink grant (e.g., the uU resources for the UCI carrying the UCI) via the transmitting SL UE(s). For example and referring to wireless communication system 300-*a* of FIG. 3A, in some examples UE 310 may receive the DCI message (e.g., CSI report trigger) from base station 305 over the uU channel between UE 310 (e.g., the first UE) and base station 305.

That is, in some examples base station 305 may transmit the trigger signal (e.g., the sidelink CSI report trigger) via the DCI message directly to the receiving SL UE (e.g., UE 310). For example, a new CSI trigger state may be included in a DCI 0_x message format (e.g., a CSI report trigger) for the receiving SL UE's sidelink CSI report from UE 310 to base station 305. Base station 305 may know when the sidelink CSI report will be ready (e.g., the timeline it takes for UE 310 to prepare the CSI report), and may therefore transmit the polling uplink grant (e.g., the trigger signal triggering the CSI report and indicating the uU resources allocated to the UCI) accordingly.

Referring to wireless communication system 300-*b* of FIG. 3B, in some examples the sidelink CSI trigger may be tunneled through the transmitting SL UE(s) to the receiving SL UE. That is, instead of transmitting the DCI 0_1 grant directly to the receiving SL UE (e.g., UE 310), base station 305 may tunnel the grant in a DCI format 3_0 message to the transmitting SL UE(s) and the SCI grant from the transmitting SL UE to the receiving SL UE. That is, base station 305 may transmit the DCI message (e.g., using a DCI format 3_0 message) to UE 315. In some examples, base station 305 may add the DCI format 0_1 grant for the receiving SL UE to the end of a new jumbo DCI format 3_0 message for the sidelink CSI report trigger. The transmitting SL UE (e.g., UE 315 in this example) may then transmit (e.g., relay) the DCI format 0_1 message (e.g., the CSI report trigger signal) to the receiving SL UE to trigger the sidelink CSI report. In some examples, this may include the transmitting SL UE(s) including the DCI format 0_1 message (e.g., grant) as part of the payload in an SCI-1 and/or SCI-2 message to serve as the trigger for the sidelink CSI report. Accordingly, UE 315 may tunnel or otherwise relay the CSI report trigger (e.g., the trigger signal) to UE 310 to trigger transmission of the layer one uplink control message (e.g., the CSI report carried in UCI).

Figure 4:
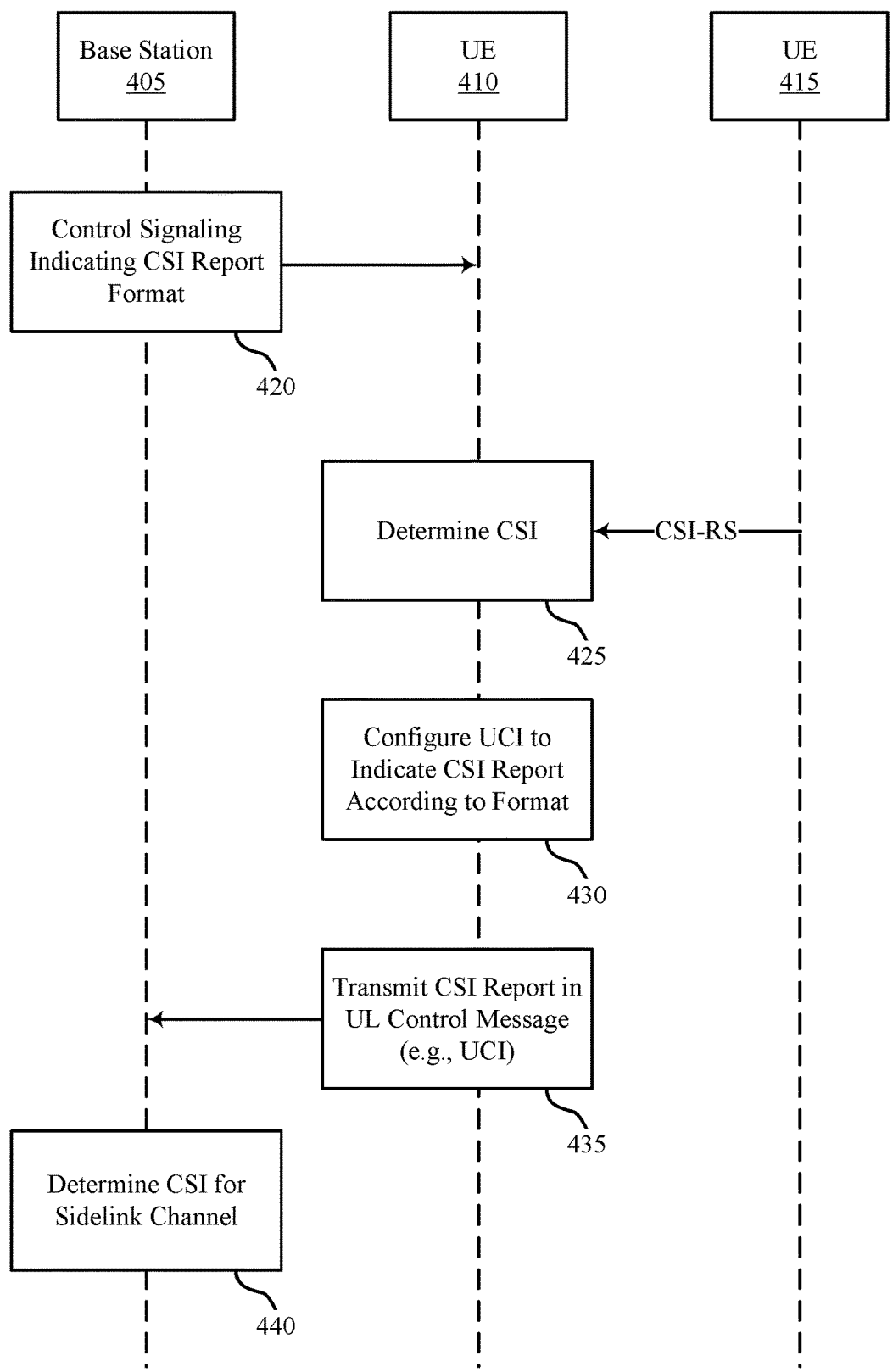
FIG. 4 illustrates an example of a process that supports layer one sidelink CSI reporting in accordance with aspects of the present disclosure.

FIG. 4 illustrates an example of a process 400 that supports layer one sidelink CSI reporting in accordance with aspects of the present disclosure. Process 400 may implement aspects of wireless communication systems 100, 200 and/or 300. Aspects of process 400 may be implemented at or implemented by base station 405, UE 410, and/or UE 415, which may be examples of the corresponding devices described herein. UE 410, in this example, may be an example of a first UE, which may also be referred to as a receiving SL UE. UE 415, in this example, may be an example of a second UE, which may also be referred to as a transmitting SL UE.

At 420, base station 405 may transmit or otherwise provide (and UE 410 may receive or otherwise obtain) control signaling carrying or otherwise conveying an indication of a format for a CSI report. The CSI report may be for indicating CSI for sidelink channel between UE 410 and UE 415.

At 425, UE 410 may determine the CSI for the sidelink channel between UE 410 and UE 415. For example, UE 415 may transmit CSI-RS using sidelink resources (e.g., resources configured for a PC5 interface). UE 410 may measure the CSI-RS to determine the CSI for the sidelink channel. For example, UE 410 may determine the reference signal received power (RSRP), reference signal strength indicator (RSSI), signal-to-noise ratio (SNR), and/or any other CQI information for the sidelink channel. In some aspects, this may include UE 410 receiving a trigger signal from UE 415 triggering the reference signal transmissions (e.g., the CSI-RS transmissions) or otherwise indicating that the CSI-RS transmissions will occur.

In some aspects, this may include identifying sidelink resources and/or uU resources allocated to UE 415 for the reference signal transmissions (e.g., for the CSI-RS transmissions). Accordingly, UE 410 may monitor for transmissions of the reference signal from UE 415 using the sidelink and/or uU resources to determine the CSI for the sidelink channel. In some aspects, this may include UE 410 measuring or otherwise determining CSI for each sidelink channel between UE 410 and a plurality of second UEs (e.g., a plurality of transmitting SL UEs).

At 430, UE 410 may configure a layer one uplink control message (e.g., the UCI message to be conveyed via PUCCH and/or PUSCH) according to the format indicated in the control signaling. For example, the control signaling may indicate that the format includes a uU configured format for the CSI report. The uU configured format may include the layer one uplink control message (e.g., in the UCI message) carrying or otherwise conveying an indication of an identifier associated with UE 415, a subchannel index associated with the sidelink channel, a CSI quantity, and the like.

At 435, UE 410 may transmit or otherwise provide (and base station 405 may receive or otherwise obtain) the layer one uplink control message indicating the CSI report. In some aspects, this may include base station 405 transmitting or otherwise providing (and UE 410 receiving or otherwise obtaining) a request triggering the CSI report. For example, base station 405 may transmit a DCI message over a uU channel between UE 410 and base station 405 indicating the request. In another example, base station 405 may transmit a DCI message to UE 415 indicating the request for the CSI report, and UE 415 may then tunnel or otherwise relay the request to UE 410 via the sidelink channel (e.g., in SCI-1 and/or SCI-2 message(s)). In some examples and in response to the request, UE 410 may transmit a layer two message (e.g., MAC CE) to UE 415 triggering reference signal transmissions. Accordingly, UE 410 may determine the CSI for the sidelink channel based on the triggered reference signal transmissions.

In some aspects, UE 410 may compile one or more instances of CSI for the sidelink channel between UE 410 and UE 415 and/or between UE 410 and other transmitting SL UEs. Base station 405 may transmit or otherwise provide (and UE 410 may receive or otherwise obtain) a common request for each instance of the CSI, with UE 410 transmitting a single layer one uplink control message that indicates the one or more instances of the CSI. In some aspects, base station 405 may transmit separate requests for each instance of the CSI, and UE 410 may transmit separate layer one uplink control messages indicating the requested CSI.

At 440, base station 405 may identify or otherwise determine the CSI for the sidelink channel based on the layer one uplink control message. For example, base station 405 may decode the layer one uplink control message (e.g., the UCI message) to recover the CSI report.

Figure 5:
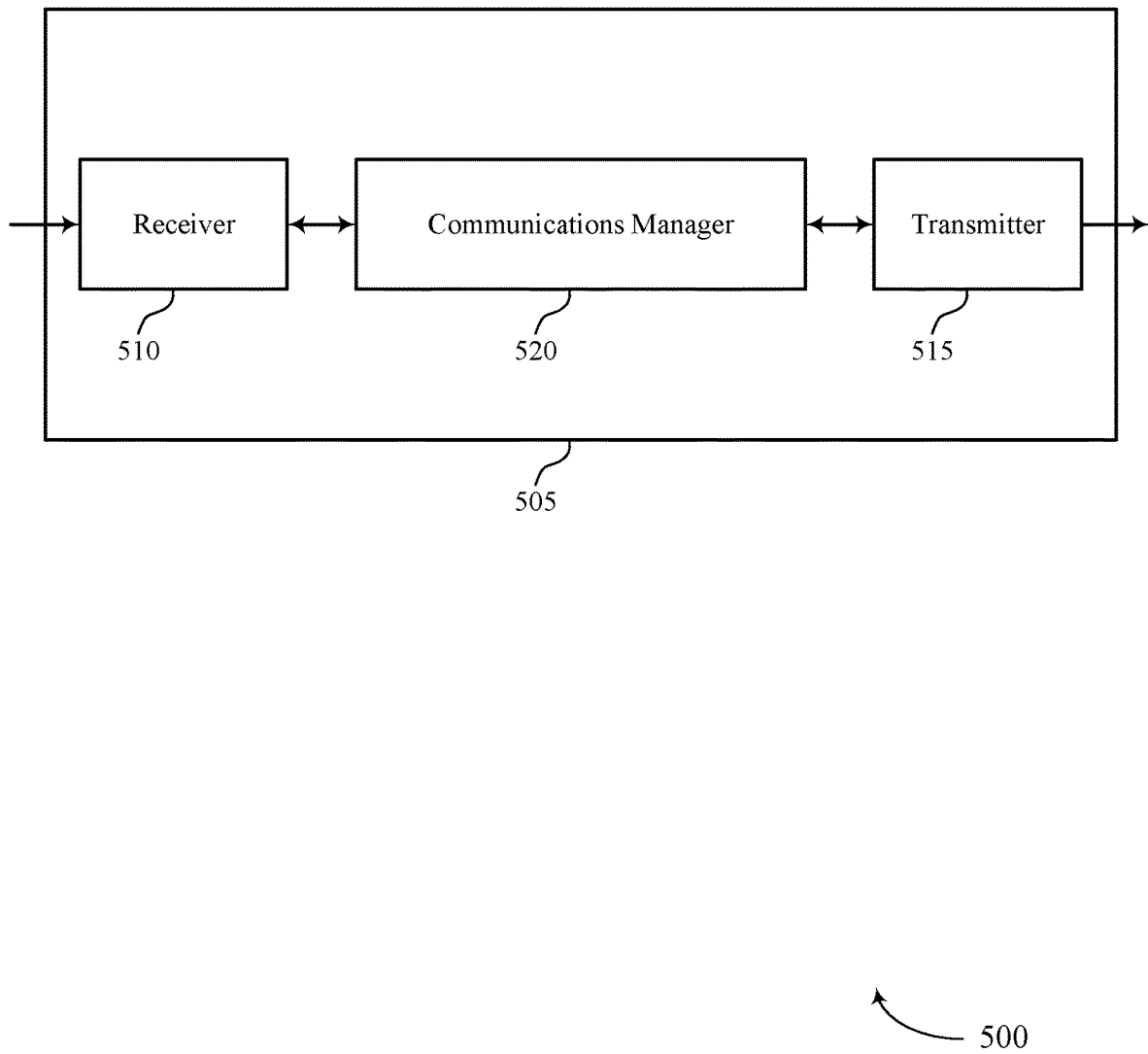
FIGS. 5 and 6 show block diagrams of devices that support layer one sidelink CSI reporting in accordance with aspects of the present disclosure.

FIG. 5 shows a block diagram 500 of a device 505 that supports layer one sidelink CSI reporting in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to layer one sidelink CSI reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to layer one sidelink CSI reporting). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of layer one sidelink CSI reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving control signaling including an indication of a format for a CSI report indicating CSI for a sidelink channel between the first UE and a second UE. The communications manager 520 may be configured as or otherwise support a means for determining the CSI for the sidelink channel between the first UE and the second UE. The communications manager 520 may be configured as or otherwise support a means for configuring a layer one uplink control message to indicate the CSI report according to the format. The communications manager 520 may be configured as or otherwise support a means for transmitting, based on the format, the layer one uplink control message to a base station indicating the CSI report.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for providing CSI reports for sidelink channels using UCI messages conveyed via PUCCH and/or PUSCH.

Figure 6:
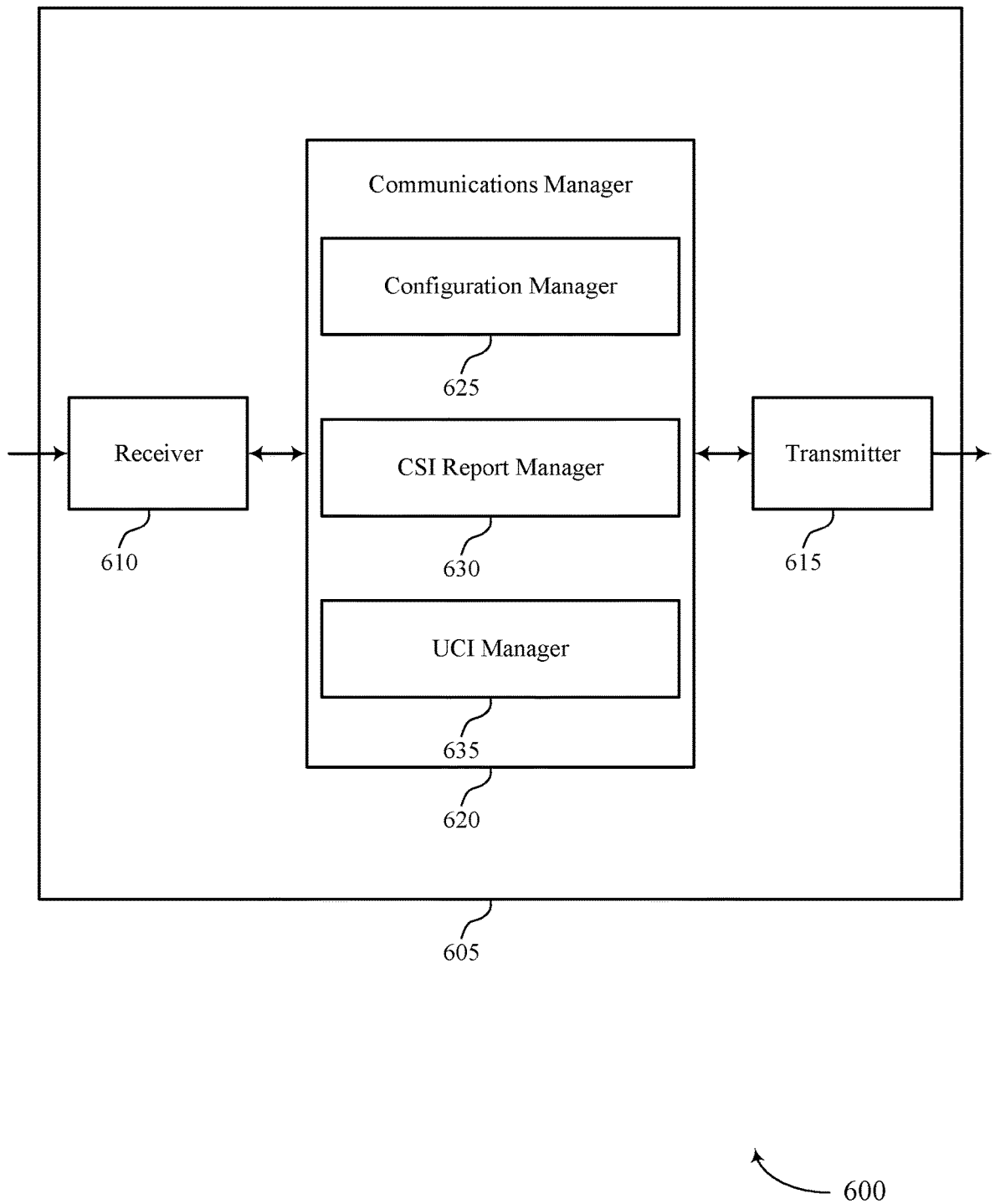

FIG. 6 shows a block diagram 600 of a device 605 that supports layer one sidelink CSI reporting in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to layer one sidelink CSI reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to layer one sidelink CSI reporting). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of layer one sidelink CSI reporting as described herein. For example, the communications manager 620 may include a configuration manager 625, a CSI report manager 630, a UCI manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The configuration manager 625 may be configured as or otherwise support a means for receiving control signaling including an indication of a format for a CSI report indicating CSI for a sidelink channel between the first UE and a second UE. The CSI report manager 630 may be configured as or otherwise support a means for determining the CSI for the sidelink channel between the first UE and the second UE. The UCI manager 635 may be configured as or otherwise support a means for configuring a layer one uplink control message to indicate the CSI report according to the format. The UCI manager 635 may be configured as or otherwise support a means for transmitting, based on the format, the layer one uplink control message to a base station indicating the CSI report.

Figure 7:
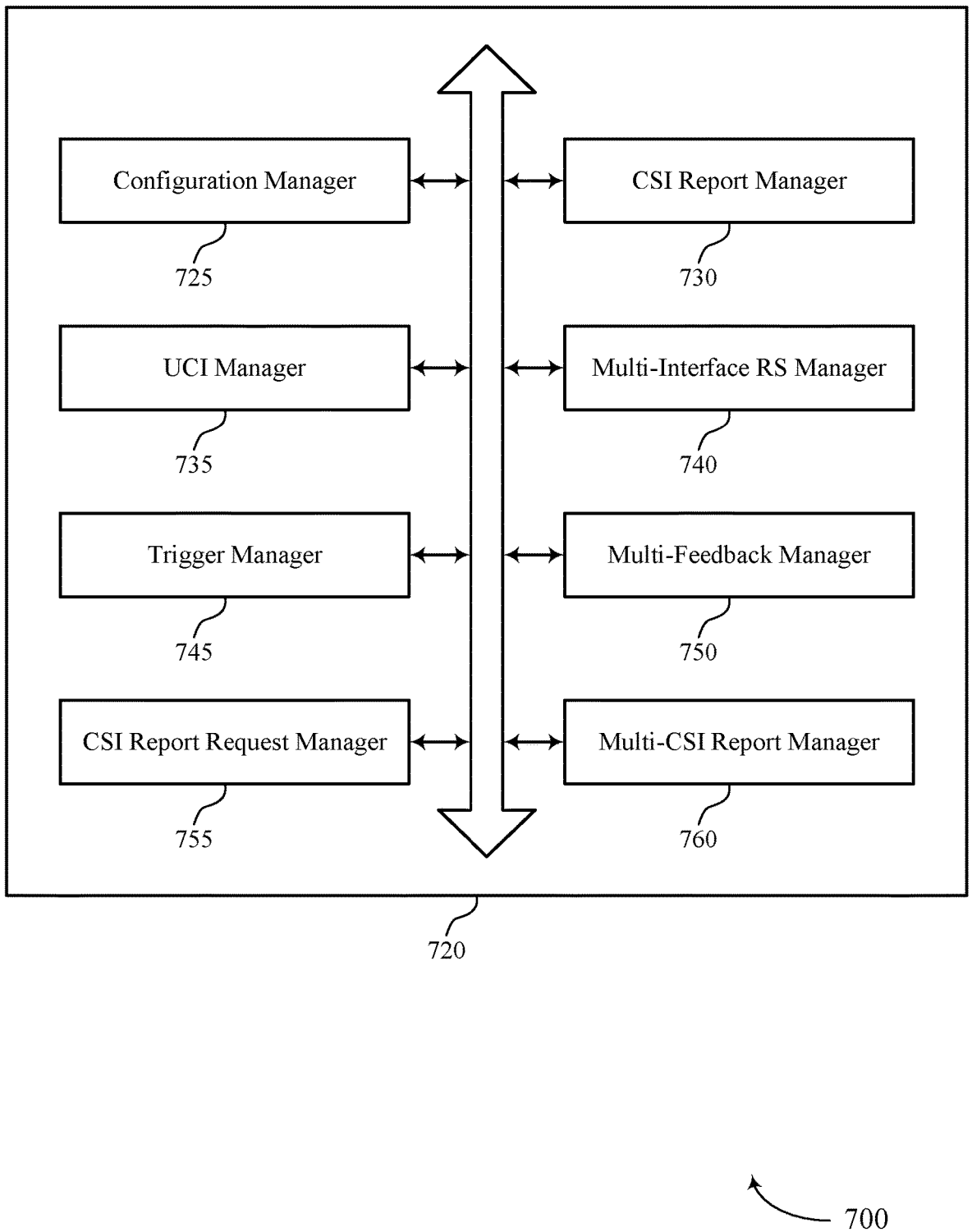
FIG. 7 shows a block diagram of a communications manager that supports layer one sidelink CSI reporting in accordance with aspects of the present disclosure.

FIG. 7 shows a block diagram 700 of a communications manager 720 that supports layer one sidelink CSI reporting in accordance with aspects of the present disclosure. The communications manager 720 may be an example of aspects of a communications manager 520, a communications manager 620, or both, as described herein. The communications manager 720, or various components thereof, may be an example of means for performing various aspects of layer one sidelink CSI reporting as described herein. For example, the communications manager 720 may include a configuration manager 725, a CSI report manager 730, a UCI manager 735, a multi-interface RS manager 740, a trigger manager 745, a multi-feedback manager 750, a CSI report request manager 755, a multi-CSI report manager 760, or any combination thereof. Each of these components may communicate, directly or indirectly, with one another (e.g., via one or more buses).

The communications manager 720 may support wireless communication at a first UE in accordance with examples as disclosed herein. The configuration manager 725 may be configured as or otherwise support a means for receiving control signaling including an indication of a format for a CSI report indicating CSI for a sidelink channel between the first UE and a second UE. The CSI report manager 730 may be configured as or otherwise support a means for determining the CSI for the sidelink channel between the first UE and the second UE. The UCI manager 735 may be configured as or otherwise support a means for configuring a layer one uplink control message to indicate the CSI report according to the format. In some examples, the UCI manager 735 may be configured as or otherwise support a means for transmitting, based on the format, the layer one uplink control message to a base station indicating the CSI report.

In some examples, the multi-interface RS manager 740 may be configured as or otherwise support a means for determining, based on the control signaling, that the format includes a uU configured format for the CSI report, the uU configured format including at least one of an identifier associated with the second UE, a subchannel index associated with the sidelink channel between the first UE and the second UE, a CSI quantity associated with the CSI, or combinations thereof.

In some examples, the multi-interface RS manager 740 may be configured as or otherwise support a means for identifying, based on the control signaling, sidelink resources, uU resources, or both, allocated to the second UE for reference signal transmissions. In some examples, the multi-interface RS manager 740 may be configured as or otherwise support a means for monitoring for transmissions of the reference signal from the second UE using the sidelink resources, the uU resources, or both, where determining the CSI is based on the monitoring.

In some examples, the trigger manager 745 may be configured as or otherwise support a means for receiving a trigger signal from the second UE triggering reference signal transmissions, where the trigger signal indicates a cell identifier associated with the base station and the CSI is determined based on the trigger signal.

In some examples, the multi-feedback manager 750 may be configured as or otherwise support a means for determining CSI for each sidelink channel between the first UE and a corresponding set of multiple second UEs, where the layer one uplink control message indicates the CSI for each sidelink channel.

In some examples, the CSI report request manager 755 may be configured as or otherwise support a means for receiving a request from the base station triggering the CSI report.

In some examples, the CSI report request manager 755 may be configured as or otherwise support a means for transmitting, based on the request, a layer two message to the second UE triggering reference signal transmissions, where the CSI is determined based on the reference signal transmissions.

In some examples, the CSI report request manager 755 may be configured as or otherwise support a means for receiving, from the base station, a DCI message over a uU channel between the first UE and the base station indicating the request.

In some examples, the CSI report request manager 755 may be configured as or otherwise support a means for receiving, from the second UE relayed from the base station, a DCI over the sidelink channel between the first UE and the base station indicating the request.

In some examples, the multi-CSI report manager 760 may be configured as or otherwise support a means for compiling one or more instances of CSI for the sidelink channel between the first UE and the second UE, where the layer one uplink control message includes the one or more instances of CSI.

In some examples, the multi-CSI report manager 760 may be configured as or otherwise support a means for receiving a separate request for each instance of the CSI for the sidelink channel. In some examples, the multi-CSI report manager 760 may be configured as or otherwise support a means for transmitting, according to each separate request, a separate layer one uplink control message indicating the requested CSI.

In some examples, the multi-CSI report manager 760 may be configured as or otherwise support a means for receiving a common request for each instance of the CSI for the sidelink channel. In some examples, the multi-CSI report manager 760 may be configured as or otherwise support a means for transmitting, according to the common request, one layer one uplink control message indicating the one or more instances of CSI.

In some examples, the layer one uplink control message includes an uplink control information message carried over a PUCCH message, an PUSCH message, or both.

Figure 8:
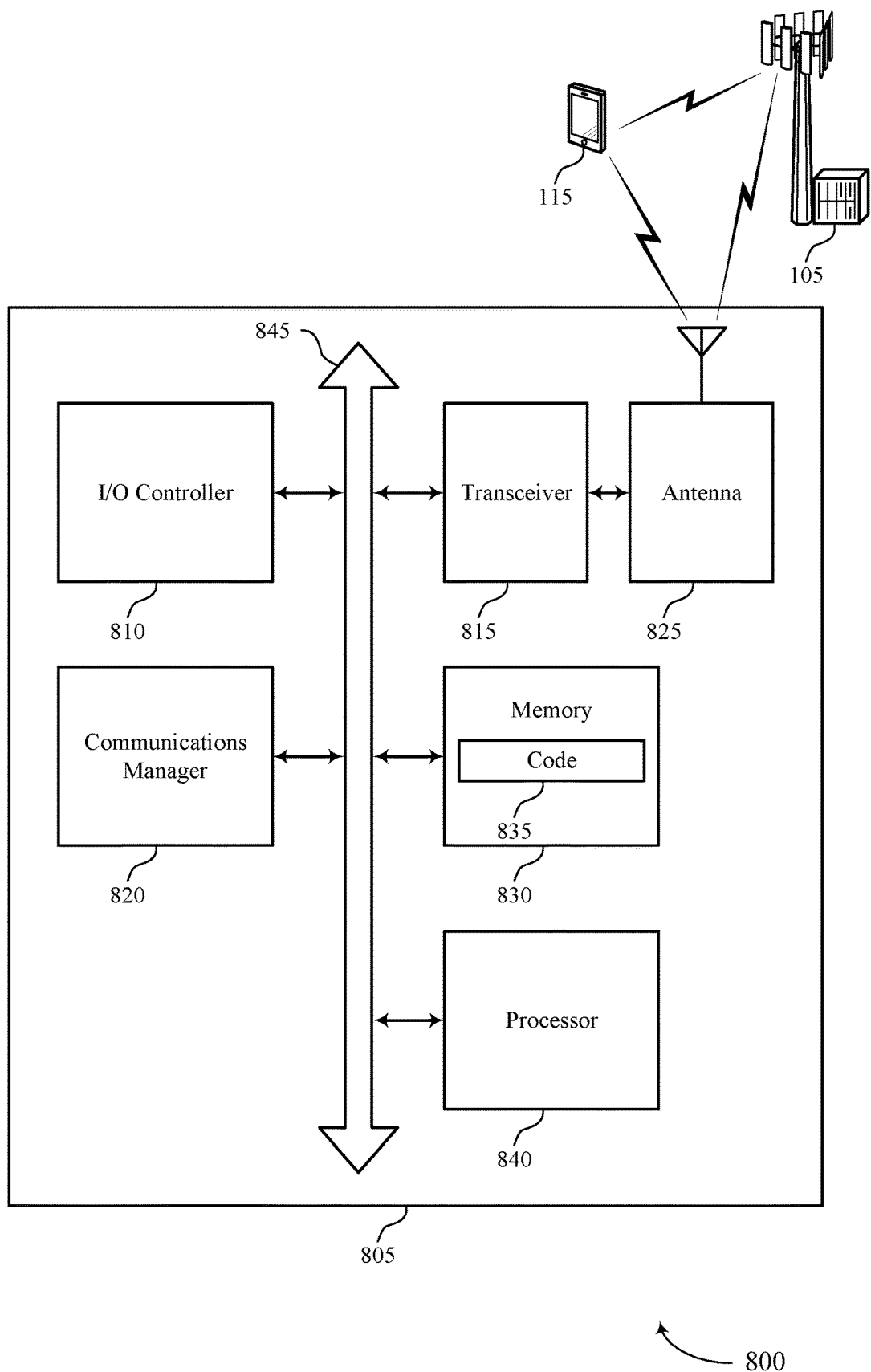
FIG. 8 shows a diagram of a system including a device that supports layer one sidelink CSI reporting in accordance with aspects of the present disclosure.

FIG. 8 shows a diagram of a system 800 including a device 805 that supports layer one sidelink CSI reporting in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as i0S®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting layer one sidelink CSI reporting). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving control signaling including an indication of a format for a CSI report indicating CSI for a sidelink channel between the first UE and a second UE. The communications manager 820 may be configured as or otherwise support a means for determining the CSI for the sidelink channel between the first UE and the second UE. The communications manager 820 may be configured as or otherwise support a means for configuring a layer one uplink control message to indicate the CSI report according to the format. The communications manager 820 may be configured as or otherwise support a means for transmitting, based on the format, the layer one uplink control message to a base station indicating the CSI report.

By including or configuring the communications manager 820 in accordance with examples as described herein, the device 805 may support techniques for providing CSI reports for sidelink channels using UCI messages conveyed via PUCCH and/or PUSCH.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of layer one sidelink CSI reporting as described herein, or the processor 840 and the memory 830 may be otherwise configured to perform or support such operations.

Figure 9:
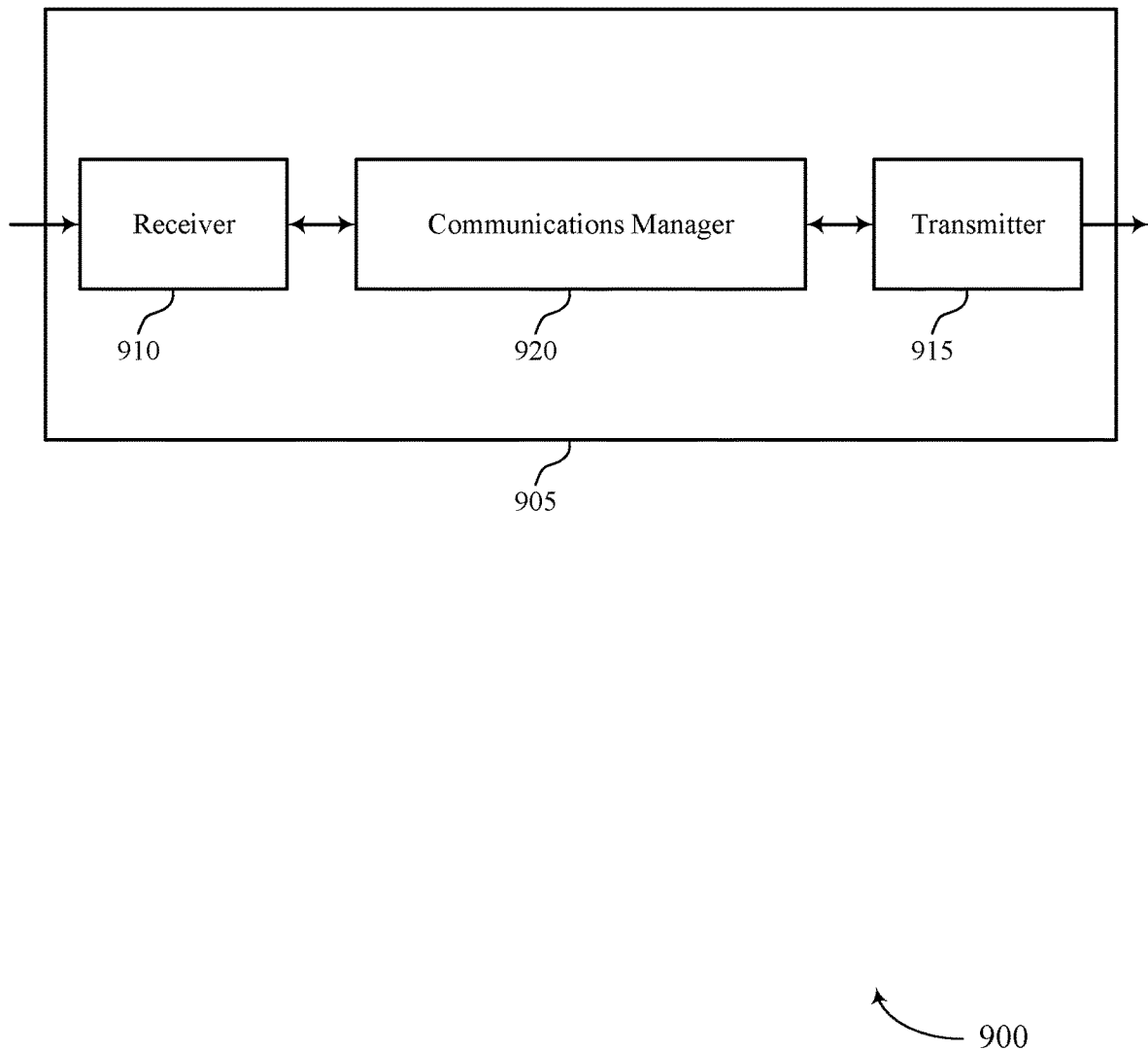
FIGS. 9 and 10 show block diagrams of devices that support layer one sidelink CSI reporting in accordance with aspects of the present disclosure.

FIG. 9 shows a block diagram 900 of a device 905 that supports layer one sidelink CSI reporting in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to layer one sidelink CSI reporting). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to layer one sidelink CSI reporting). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of layer one sidelink CSI reporting as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a first UE, control signaling including an indication of a format for a CSI report indicating CSI for a sidelink channel between the first UE and a second UE. The communications manager 920 may be configured as or otherwise support a means for receiving, based on the format, a layer one uplink control message from the first UE indicating the CSI report. The communications manager 920 may be configured as or otherwise support a means for determining the CSI for the sidelink channel between the first UE and the second UE based on the CSI report.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for providing CSI reports for sidelink channels using UCI messages conveyed via PUCCH and/or PUSCH.

Figure 10:
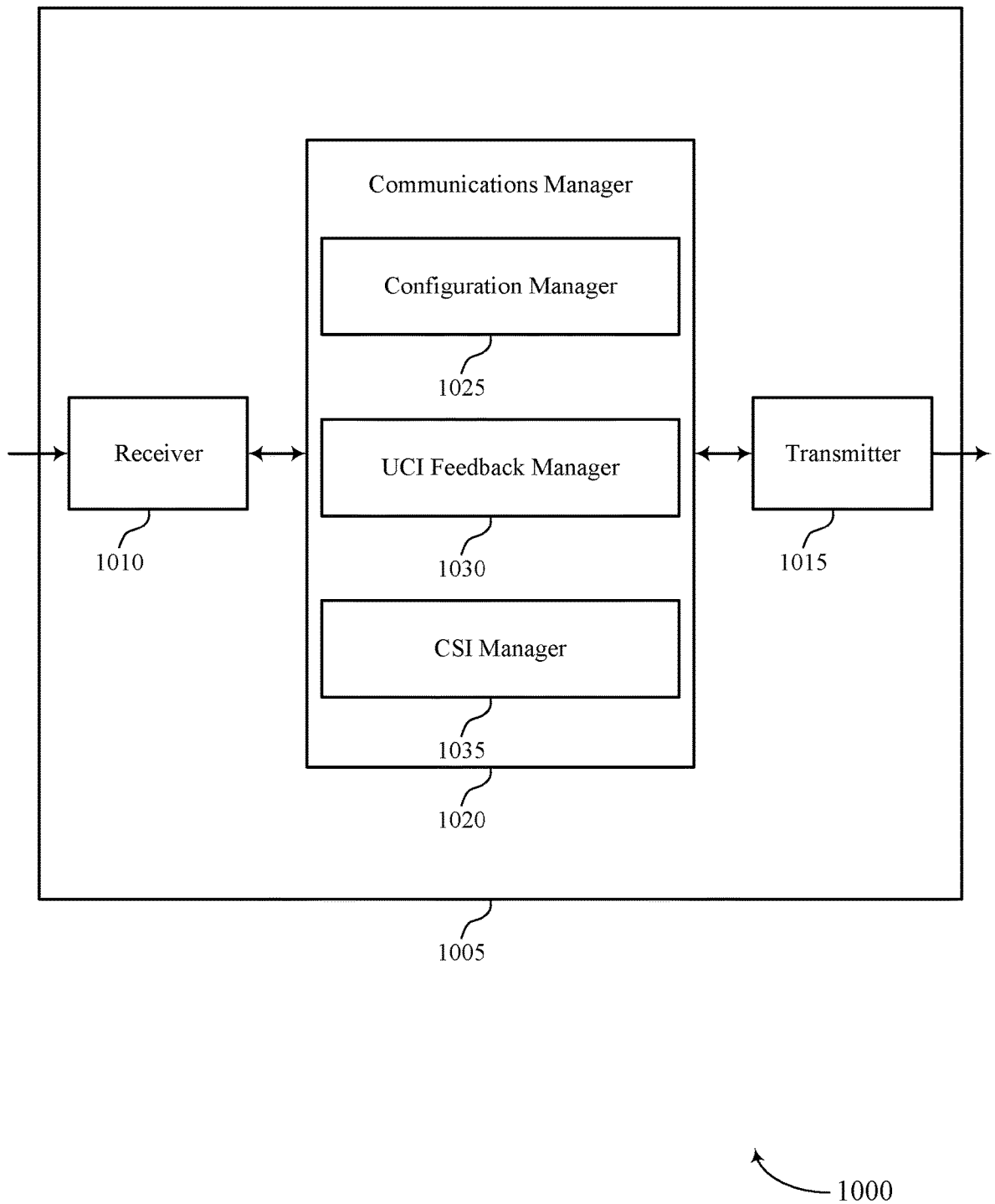

FIG. 10 shows a block diagram 1000 of a device 1005 that supports layer one sidelink CSI reporting in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to layer one sidelink CSI reporting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to layer one sidelink CSI reporting). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of layer one sidelink CSI reporting as described herein. For example, the communications manager 1020 may include a configuration manager 1025, a UCI feedback manager 1030, a CSI manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration manager 1025 may be configured as or otherwise support a means for transmitting, to a first UE, control signaling including an indication of a format for a CSI report indicating CSI for a sidelink channel between the first UE and a second UE. The UCI feedback manager 1030 may be configured as or otherwise support a means for receiving, based on the format, a layer one uplink control message from the first UE indicating the CSI report. The CSI manager 1035 may be configured as or otherwise support a means for determining the CSI for the sidelink channel between the first UE and the second UE based on the CSI report.

Figure 11:
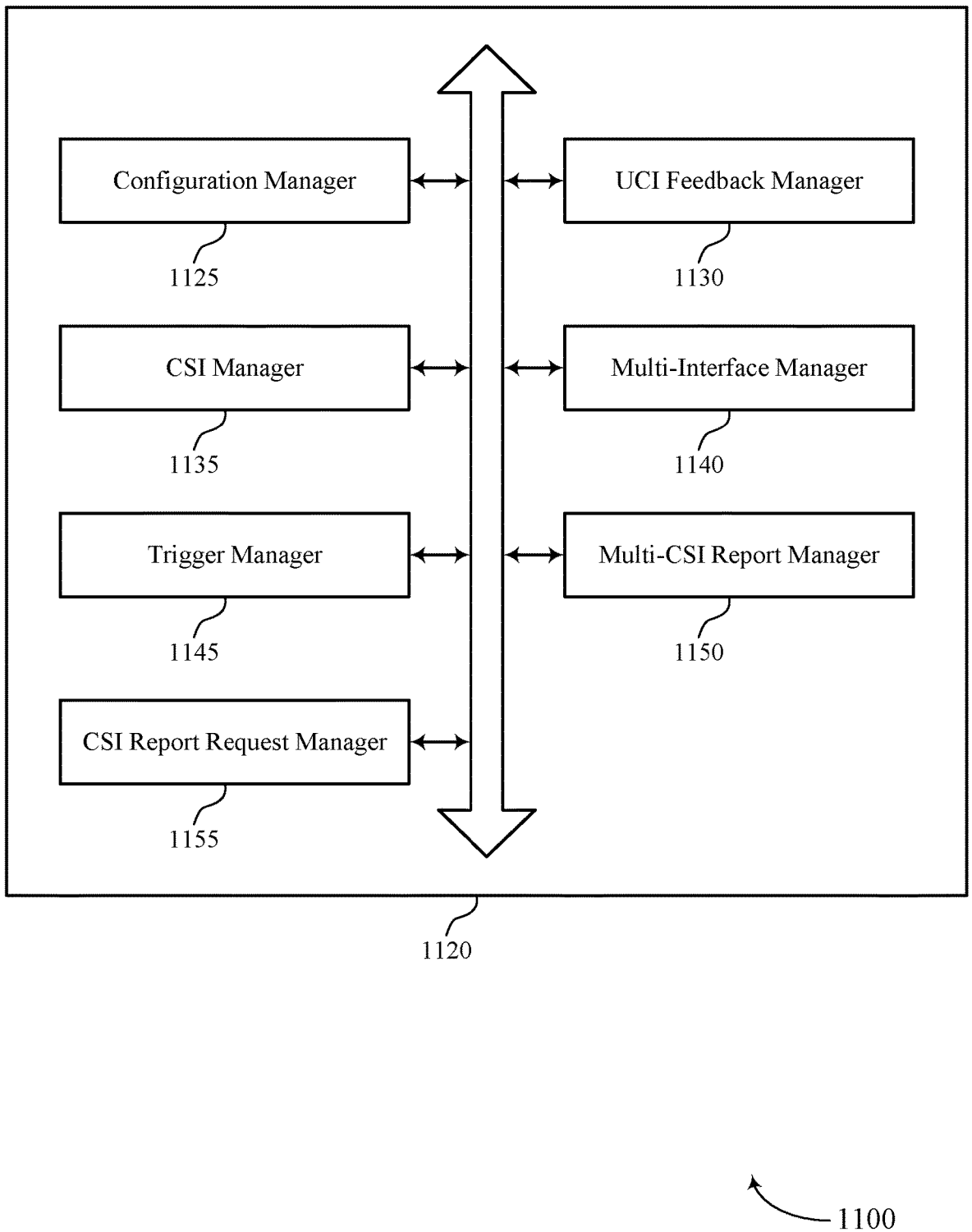
FIG. 11 shows a block diagram of a communications manager that supports layer one sidelink CSI reporting in accordance with aspects of the present disclosure.

FIG. 11 shows a block diagram 1100 of a communications manager 1120 that supports layer one sidelink CSI reporting in accordance with aspects of the present disclosure. The communications manager 1120 may be an example of aspects of a communications manager 920, a communications manager 1020, or both, as described herein. The communications manager 1120, or various components thereof, may be an example of means for performing various aspects of layer one sidelink CSI reporting as described herein. For example, the communications manager 1120 may include a configuration manager 1125, a UCI feedback manager 1130, a CSI manager 1135, a multi-interface manager 1140, a trigger manager 1145, a multi-CSI report manager 1150, a CSI report request manager 1155, or any combination thereof. Each of these components may communicate, directly or indirectly, with one another (e.g., via one or more buses).

The communications manager 1120 may support wireless communication at a base station in accordance with examples as disclosed herein. The configuration manager 1125 may be configured as or otherwise support a means for transmitting, to a first UE, control signaling including an indication of a format for a CSI report indicating CSI for a sidelink channel between the first UE and a second UE. The UCI feedback manager 1130 may be configured as or otherwise support a means for receiving, based on the format, a layer one uplink control message from the first UE indicating the CSI report. The CSI manager 1135 may be configured as or otherwise support a means for determining the CSI for the sidelink channel between the first UE and the second UE based on the CSI report.

In some examples, the multi-interface manager 1140 may be configured as or otherwise support a means for configuring the control signaling to indicate the format including a uU configured format for the CSI report, the uU configured format including at least one of an identifier associated with the second UE, a subchannel index associated with the sidelink channel between the first UE and the second UE, a CSI quantity associated with the CSI, or combinations thereof.

In some examples, the multi-interface manager 1140 may be configured as or otherwise support a means for configuring the control signaling to indicate sidelink resources, uU resources, or both, allocated to the second UE for reference signal transmissions, where the second UE performs transmissions of the reference signal using the sidelink resources, the uU resources, or both.

In some examples, the trigger manager 1145 may be configured as or otherwise support a means for transmitting a trigger signal to the second UE triggering reference signal transmissions, where the trigger signal indicates a cell identifier associated with the base station and the CSI is based on the trigger signal.

In some examples, the multi-CSI report manager 1150 may be configured as or otherwise support a means for determining, based on the layer one uplink control message, the CSI for each sidelink channel between the first UE and a corresponding set of multiple second UEs, where the layer one uplink control message indicates the CSI for each sidelink channel.

In some examples, the CSI report request manager 1155 may be configured as or otherwise support a means for transmitting a request triggering the CSI report.

In some examples, the CSI report request manager 1155 may be configured as or otherwise support a means for transmitting, to the first UE, a DCI message over a uU channel between the first UE and the base station indicating the request.

In some examples, the CSI report request manager 1155 may be configured as or otherwise support a means for transmitting, to the second UE for relaying to the first UE, a DCI over a uU channel between the second UE and the base station indicating the request.

In some examples, the multi-CSI report manager 1150 may be configured as or otherwise support a means for identifying, based on the layer one uplink control message, one or more instances of CSI for the sidelink channel between the first UE and the second UE.

In some examples, the multi-CSI report manager 1150 may be configured as or otherwise support a means for transmitting a separate request for each instance of the CSI for the sidelink channel. In some examples, the multi-CSI report manager 1150 may be configured as or otherwise support a means for receiving, according to each separate request, a separate layer one uplink control message indicating the requested CSI.

In some examples, the multi-CSI report manager 1150 may be configured as or otherwise support a means for transmitting a common request for each instance of the CSI for the sidelink channel. In some examples, the multi-CSI report manager 1150 may be configured as or otherwise support a means for receiving, according to the common request, one layer one uplink control message indicating the one or more instances of CSI.

In some examples, the layer one uplink control message includes an uplink control information message carried over a PUCCH message, an PUSCH message, or both.

Figure 12:
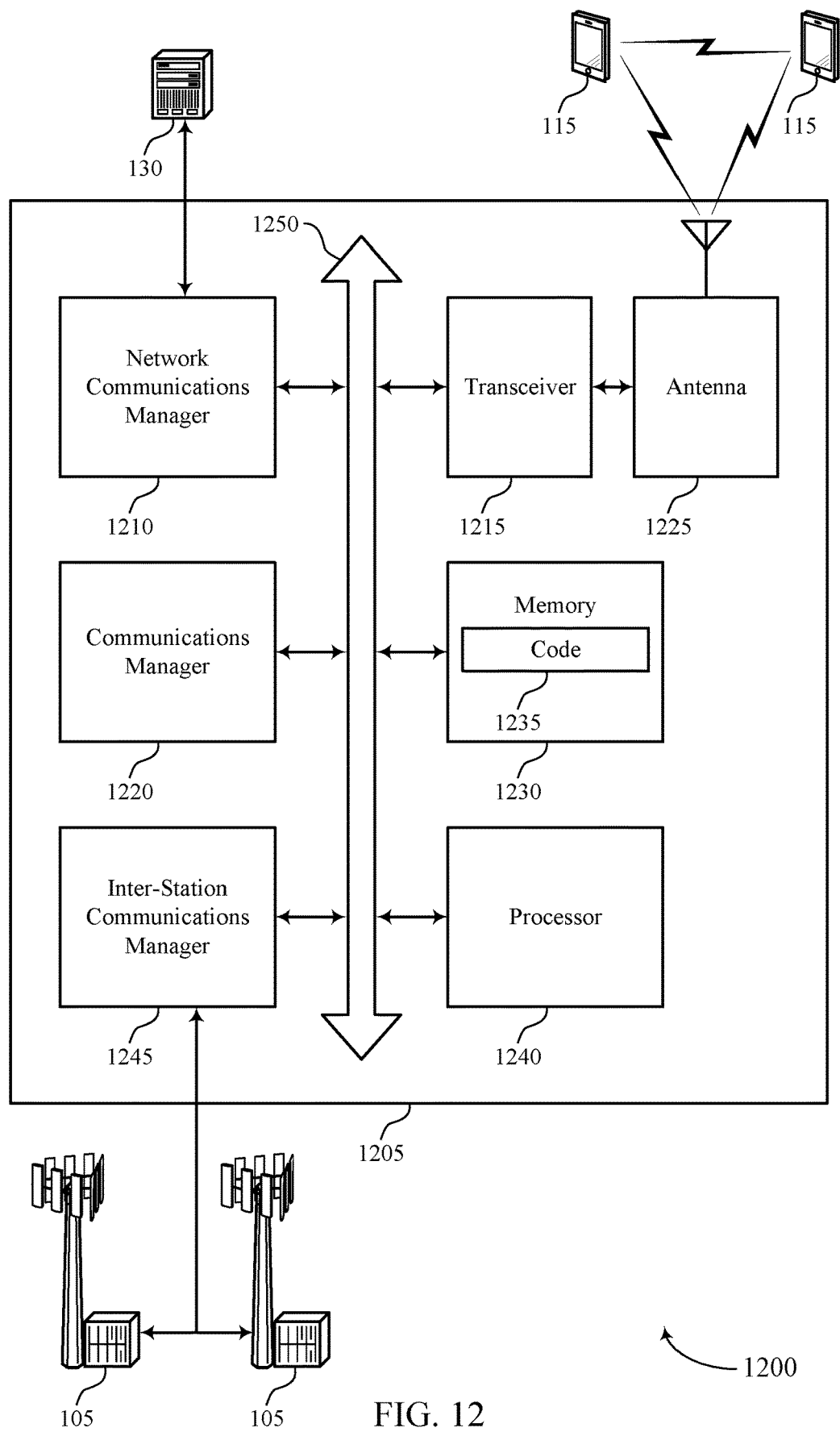
FIG. 12 shows a diagram of a system including a device that supports layer one sidelink CSI reporting in accordance with aspects of the present disclosure.

FIG. 12 shows a diagram of a system 1200 including a device 1205 that supports layer one sidelink CSI reporting in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting layer one sidelink CSI reporting). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a first UE, control signaling including an indication of a format for a CSI report indicating CSI for a sidelink channel between the first UE and a second UE. The communications manager 1220 may be configured as or otherwise support a means for receiving, based on the format, a layer one uplink control message from the first UE indicating the CSI report. The communications manager 1220 may be configured as or otherwise support a means for determining the CSI for the sidelink channel between the first UE and the second UE based on the CSI report.

By including or configuring the communications manager 1220 in accordance with examples as described herein, the device 1205 may support techniques for providing CSI reports for sidelink channels using UCI messages conveyed via PUCCH and/or PUSCH.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of layer one sidelink CSI reporting as described herein, or the processor 1240 and the memory 1230 may be otherwise configured to perform or support such operations.

Figure 13:
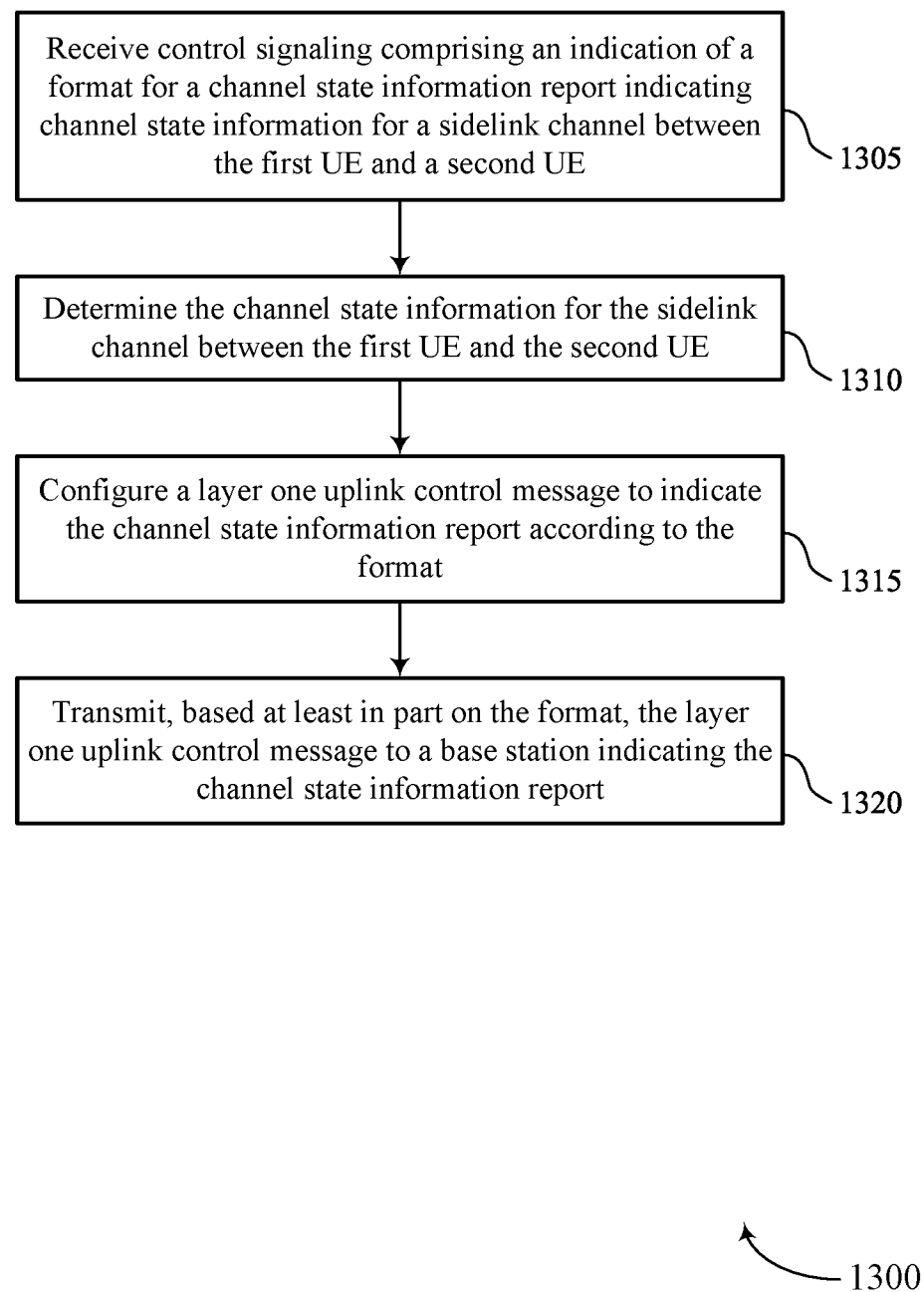
FIGS. 13 through 17 show flowcharts illustrating methods that support layer one sidelink CSI reporting in accordance with aspects of the present disclosure.

FIG. 13 shows a flowchart illustrating a method 1300 that supports layer one sidelink CSI reporting in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling including an indication of a format for a CSI report indicating CSI for a sidelink channel between the first UE and a second UE. The operations of 1305 may be performed in accordance with examples as disclosed herein. In some examples, aspects of the operations of 1305 may be performed by a configuration manager 725 as described with reference to FIG. 7.

At 1310, the method may include determining the CSI for the sidelink channel between the first UE and the second UE. The operations of 1310 may be performed in accordance with examples as disclosed herein. In some examples, aspects of the operations of 1310 may be performed by a CSI report manager 730 as described with reference to FIG. 7.

At 1315, the method may include configuring a layer one uplink control message to indicate the CSI report according to the format. The operations of 1315 may be performed in accordance with examples as disclosed herein. In some examples, aspects of the operations of 1315 may be performed by a UCI manager 735 as described with reference to FIG. 7.

At 1320, the method may include transmitting, based on the format, the layer one uplink control message to a base station indicating the CSI report. The operations of 1320 may be performed in accordance with examples as disclosed herein. In some examples, aspects of the operations of 1320 may be performed by a UCI manager 735 as described with reference to FIG. 7.

Figure 14:
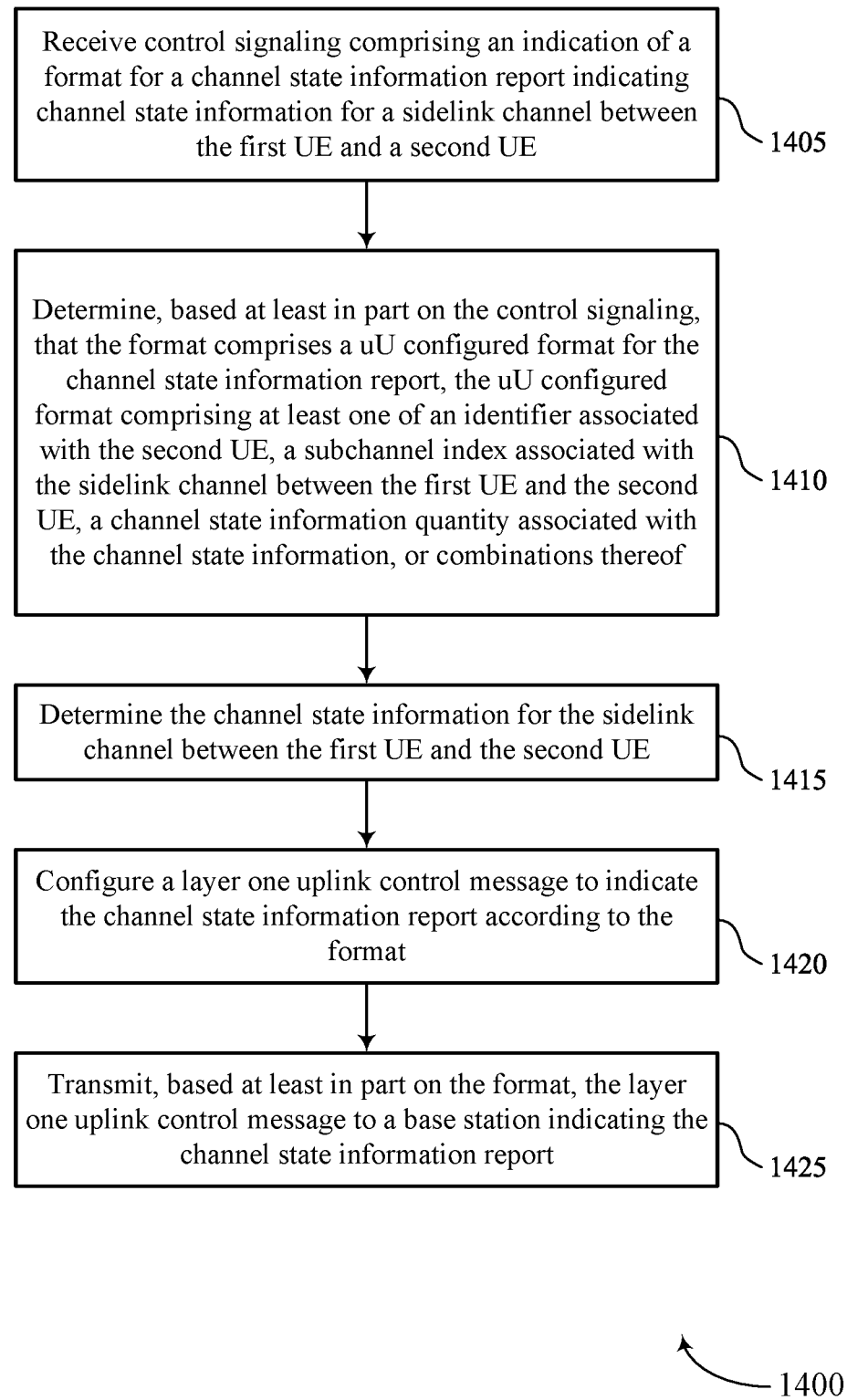

FIG. 14 shows a flowchart illustrating a method 1400 that supports layer one sidelink CSI reporting in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling including an indication of a format for a CSI report indicating CSI for a sidelink channel between the first UE and a second UE. The operations of 1405 may be performed in accordance with examples as disclosed herein. In some examples, aspects of the operations of 1405 may be performed by a configuration manager 725 as described with reference to FIG. 7.

At 1410, the method may include determining, based on the control signaling, that the format includes a uU configured format for the CSI report, the uU configured format including at least one of an identifier associated with the second UE, a subchannel index associated with the sidelink channel between the first UE and the second UE, a CSI quantity associated with the CSI, or combinations thereof. The operations of 1410 may be performed in accordance with examples as disclosed herein. In some examples, aspects of the operations of 1410 may be performed by a multi-interface RS manager 740 as described with reference to FIG. 7.

At 1415, the method may include determining the CSI for the sidelink channel between the first UE and the second UE. The operations of 1415 may be performed in accordance with examples as disclosed herein. In some examples, aspects of the operations of 1415 may be performed by a CSI report manager 730 as described with reference to FIG. 7.

At 1420, the method may include configuring a layer one uplink control message to indicate the CSI report according to the format. The operations of 1420 may be performed in accordance with examples as disclosed herein. In some examples, aspects of the operations of 1420 may be performed by a UCI manager 735 as described with reference to FIG. 7.

At 1425, the method may include transmitting, based on the format, the layer one uplink control message to a base station indicating the CSI report. The operations of 1425 may be performed in accordance with examples as disclosed herein. In some examples, aspects of the operations of 1425 may be performed by a UCI manager 735 as described with reference to FIG. 7.

Figure 15:
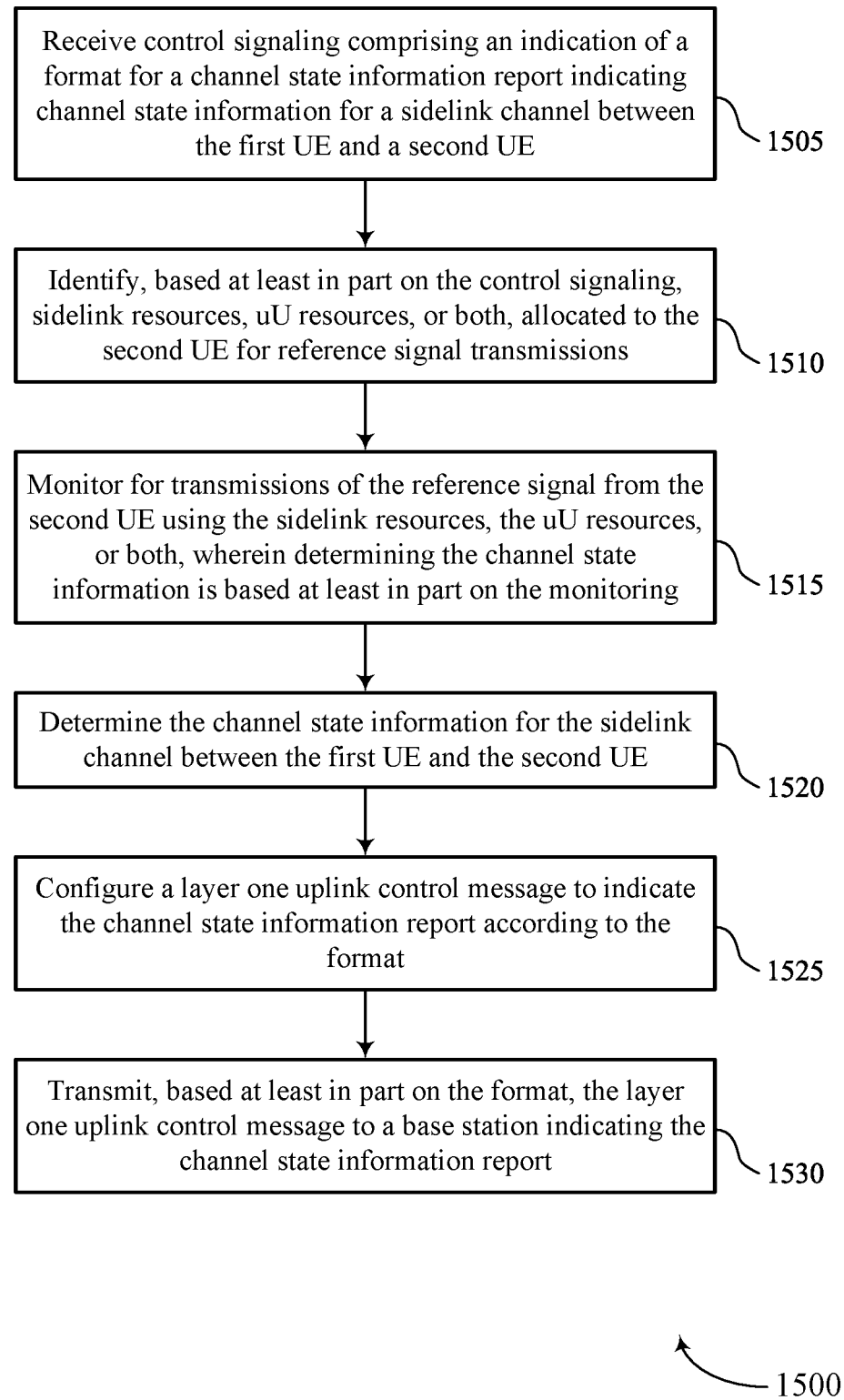

FIG. 15 shows a flowchart illustrating a method 1500 that supports layer one sidelink CSI reporting in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving control signaling including an indication of a format for a CSI report indicating CSI for a sidelink channel between the first UE and a second UE. The operations of 1505 may be performed in accordance with examples as disclosed herein. In some examples, aspects of the operations of 1505 may be performed by a configuration manager 725 as described with reference to FIG. 7.

At 1510, the method may include identifying, based on the control signaling, sidelink resources, uU resources, or both, allocated to the second UE for reference signal transmissions. The operations of 1510 may be performed in accordance with examples as disclosed herein. In some examples, aspects of the operations of 1510 may be performed by a multi-interface RS manager 740 as described with reference to FIG. 7.

At 1515, the method may include monitoring for transmissions of the reference signal from the second UE using the sidelink resources, the uU resources, or both, where determining the CSI is based on the monitoring. The operations of 1515 may be performed in accordance with examples as disclosed herein. In some examples, aspects of the operations of 1515 may be performed by a multi-interface RS manager 740 as described with reference to FIG. 7.

At 1520, the method may include determining the CSI for the sidelink channel between the first UE and the second UE. The operations of 1520 may be performed in accordance with examples as disclosed herein. In some examples, aspects of the operations of 1520 may be performed by a CSI report manager 730 as described with reference to FIG. 7.

At 1525, the method may include configuring a layer one uplink control message to indicate the CSI report according to the format. The operations of 1525 may be performed in accordance with examples as disclosed herein. In some examples, aspects of the operations of 1525 may be performed by a UCI manager 735 as described with reference to FIG. 7.

At 1530, the method may include transmitting, based on the format, the layer one uplink control message to a base station indicating the CSI report. The operations of 1530 may be performed in accordance with examples as disclosed herein. In some examples, aspects of the operations of 1530 may be performed by a UCI manager 735 as described with reference to FIG. 7.

Figure 16:
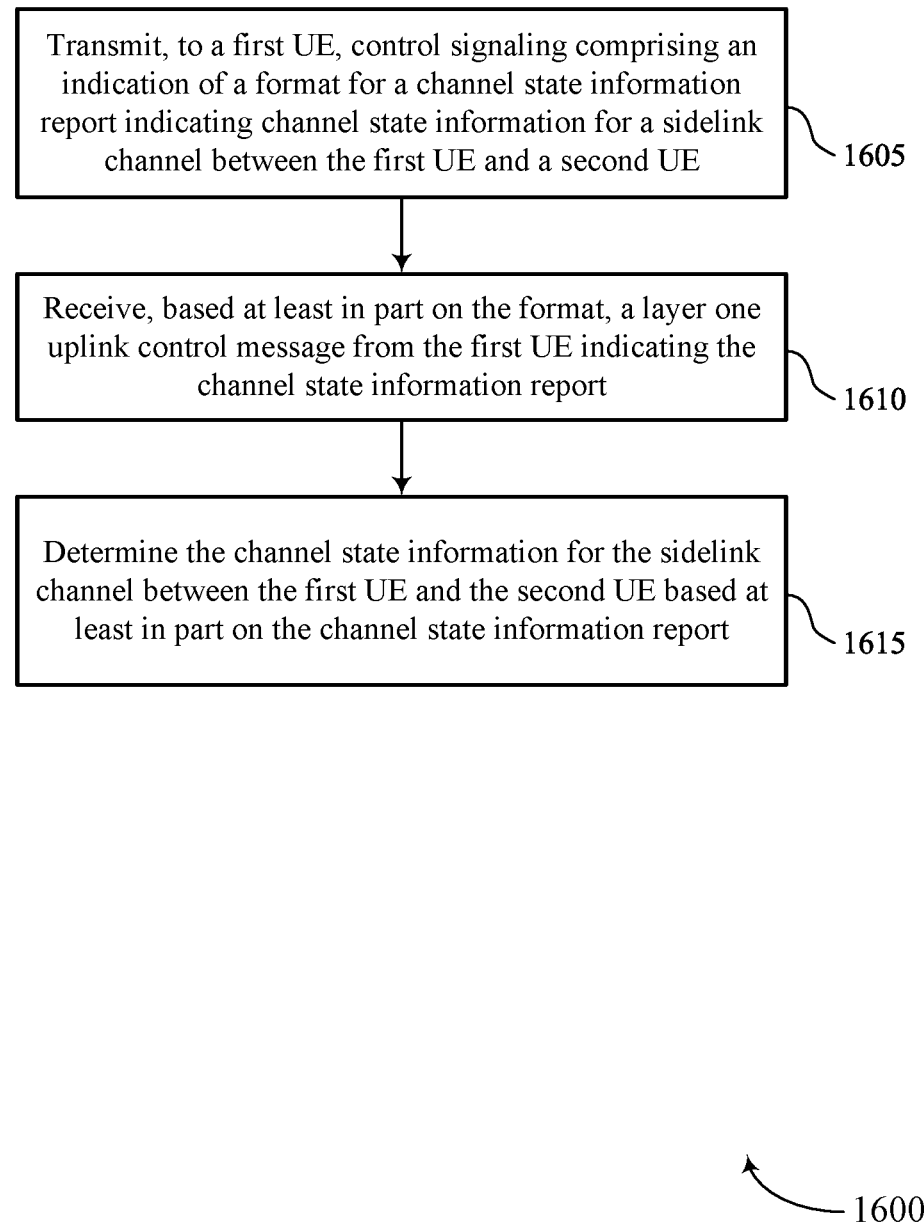

FIG. 16 shows a flowchart illustrating a method 1600 that supports layer one sidelink CSI reporting in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include transmitting, to a first UE, control signaling including an indication of a format for a CSI report indicating CSI for a sidelink channel between the first UE and a second UE. The operations of 1605 may be performed in accordance with examples as disclosed herein. In some examples, aspects of the operations of 1605 may be performed by a configuration manager 1125 as described with reference to FIG. 11.

At 1610, the method may include receiving, based on the format, a layer one uplink control message from the first UE indicating the CSI report. The operations of 1610 may be performed in accordance with examples as disclosed herein. In some examples, aspects of the operations of 1610 may be performed by a UCI feedback manager 1130 as described with reference to FIG. 11.

At 1615, the method may include determining the CSI for the sidelink channel between the first UE and the second UE based on the CSI report. The operations of 1615 may be performed in accordance with examples as disclosed herein. In some examples, aspects of the operations of 1615 may be performed by a CSI manager 1135 as described with reference to FIG. 11.

Figure 17:
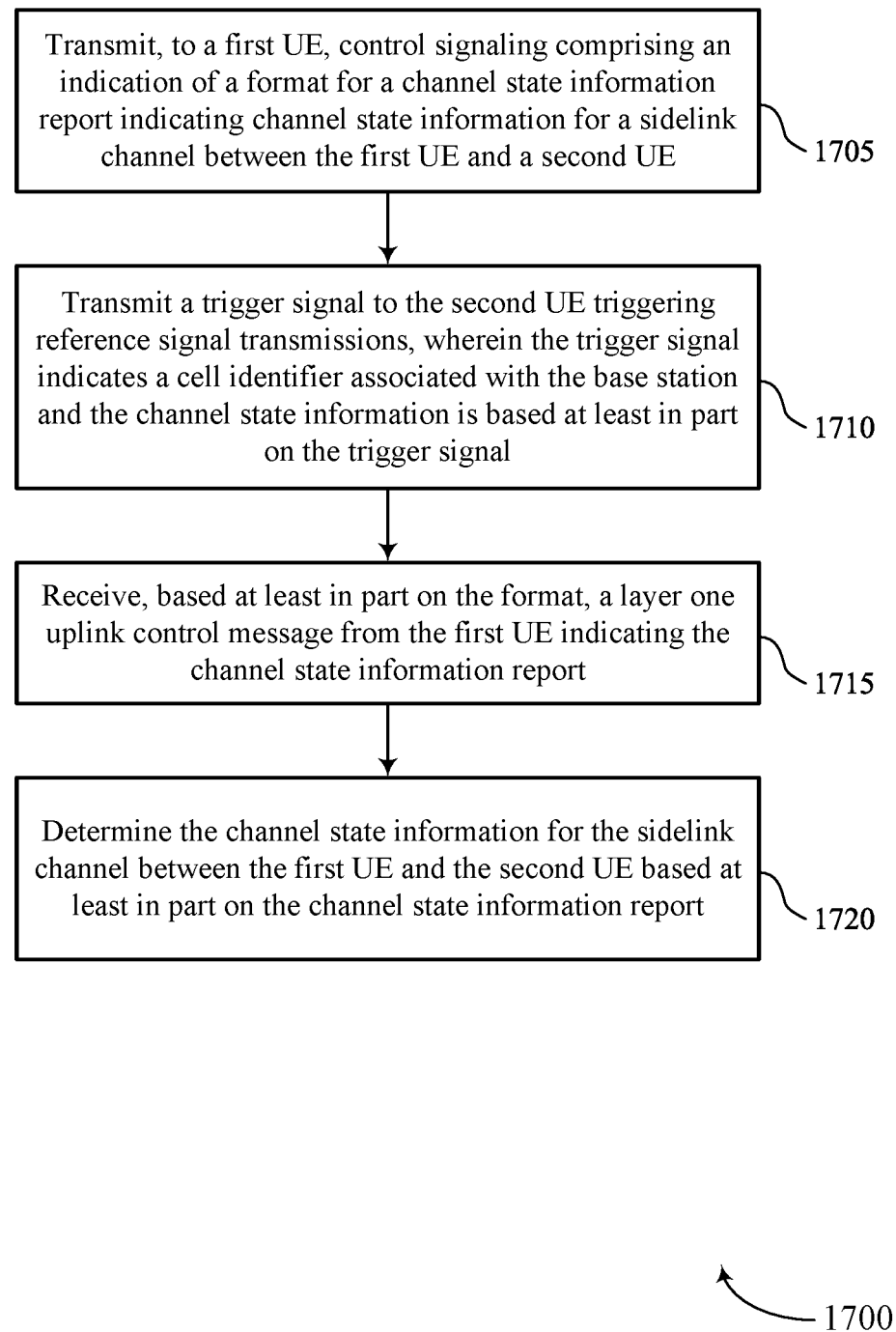

FIG. 17 shows a flowchart illustrating a method 1700 that supports layer one sidelink CSI reporting in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1705, the method may include transmitting, to a first UE, control signaling including an indication of a format for a CSI report indicating CSI for a sidelink channel between the first UE and a second UE. The operations of 1705 may be performed in accordance with examples as disclosed herein. In some examples, aspects of the operations of 1705 may be performed by a configuration manager 1125 as described with reference to FIG. 11.

At 1710, the method may include transmitting a trigger signal to the second UE triggering reference signal transmissions, where the trigger signal indicates a cell identifier associated with the base station and the CSI is based on the trigger signal. The operations of 1710 may be performed in accordance with examples as disclosed herein. In some examples, aspects of the operations of 1710 may be performed by a trigger manager 1145 as described with reference to FIG. 11.

At 1715, the method may include receiving, based on the format, a layer one uplink control message from the first UE indicating the CSI report. The operations of 1715 may be performed in accordance with examples as disclosed herein. In some examples, aspects of the operations of 1715 may be performed by a UCI feedback manager 1130 as described with reference to FIG. 11.

At 1720, the method may include determining the CSI for the sidelink channel between the first UE and the second UE based on the CSI report. The operations of 1720 may be performed in accordance with examples as disclosed herein. In some examples, aspects of the operations of 1720 may be performed by a CSI manager 1135 as described with reference to FIG. 11.

The following provides an overview of aspects of the present disclosure:

Aspect 1: A method for wireless communication at a first UE, comprising: receiving control signaling comprising an indication of a format for a CSI report indicating CSI for a sidelink channel between the first UE and a second UE; determining the CSI for the sidelink channel between the first UE and the second UE; configuring a layer one uplink control message to indicate the CSI report according to the format; and transmitting, based at least in part on the format, the layer one uplink control message to a base station indicating the CSI report.

Aspect 2: The method of aspect 1, further comprising: determining, based at least in part on the control signaling, that the format comprises a uU configured format for the CSI report, the uU configured format comprising at least one of an identifier associated with the second UE, a subchannel index associated with the sidelink channel between the first UE and the second UE, a CSI quantity associated with the CSI, or combinations thereof.

Aspect 3: The method of any of aspects 1 through 2, further comprising: identifying, based at least in part on the control signaling, sidelink resources, uU resources, or both, allocated to the second UE for reference signal transmissions; and monitoring for transmissions of the reference signal from the second UE using the sidelink resources, the uU resources, or both, wherein determining the CSI is based at least in part on the monitoring.

Aspect 4: The method of any of aspects 1 through 3, further comprising: receiving a trigger signal from the second UE triggering reference signal transmissions, wherein the trigger signal indicates a cell identifier associated with the base station and the CSI is determined based at least in part on the trigger signal.

Aspect 5: The method of any of aspects 1 through 4, further comprising: determining CSI for each sidelink channel between the first UE and a corresponding plurality of second UEs, wherein the layer one uplink control message indicates the CSI for each sidelink channel.

Aspect 6: The method of any of aspects 1 through 5, further comprising: receiving a request from the base station triggering the CSI report.

Aspect 7: The method of aspect 6, further comprising: transmitting, based at least in part on the request, a layer two message to the second UE triggering reference signal transmissions, wherein the CSI is determined based at least in part on the reference signal transmissions.

Aspect 8: The method of aspect 7, further comprising: receiving, from the base station, a DCI message over a uU channel between the first UE and the base station indicating the request.

Aspect 9: The method of any of aspects 7 through 8, further comprising: receiving, from the second UE relayed from the base station, a DCI over the sidelink channel between the first UE and the base station indicating the request.

Aspect 10: The method of any of aspects 1 through 9, further comprising: compiling one or more instances of CSI for the sidelink channel between the first UE and the second UE, wherein the layer one uplink control message comprises the one or more instances of CSI.

Aspect 11: The method of aspect 10, further comprising: receiving a separate request for each instance of the CSI for the sidelink channel; and transmitting, according to each separate request, a separate layer one uplink control message indicating the requested CSI.

Aspect 12: The method of any of aspects 10 through 11, further comprising: receiving a common request for each instance of the CSI for the sidelink channel; and transmitting, according to the common request, one layer one uplink control message indicating the one or more instances of CSI.

Aspect 13: The method of any of aspects 1 through 12, wherein the layer one uplink control message comprises an uplink control information message carried over a PUCCH message, an PUSCH message, or both.

Aspect 14: A method for wireless communication at a base station, comprising: transmitting, to a first UE, control signaling comprising an indication of a format for a CSI report indicating CSI for a sidelink channel between the first UE and a second UE; receiving, based at least in part on the format, a layer one uplink control message from the first UE indicating the CSI report; and determining the CSI for the sidelink channel between the first UE and the second UE based at least in part on the CSI report.

Aspect 15: The method of aspect 14, further comprising: configuring the control signaling to indicate the format comprising a uU configured format for the CSI report, the uU configured format comprising at least one of an identifier associated with the second UE, a subchannel index associated with the sidelink channel between the first UE and the second UE, a CSI quantity associated with the CSI, or combinations thereof.

Aspect 16: The method of any of aspects 14 through 15, further comprising: configuring the control signaling to indicate sidelink resources, uU resources, or both, allocated to the second UE for reference signal transmissions, wherein the second UE performs transmissions of the reference signal using the sidelink resources, the uU resources, or both.

Aspect 17: The method of any of aspects 14 through 16, further comprising: transmitting a trigger signal to the second UE triggering reference signal transmissions, wherein the trigger signal indicates a cell identifier associated with the base station and the CSI is based at least in part on the trigger signal.

Aspect 18: The method of any of aspects 14 through 17, further comprising: determining, based at least in part on the layer one uplink control message, the CSI for each sidelink channel between the first UE and a corresponding plurality of second UEs, wherein the layer one uplink control message indicates the CSI for each sidelink channel.

Aspect 19: The method of any of aspects 14 through 18, further comprising: transmitting a request triggering the CSI report.

Aspect 20: The method of aspect 19, further comprising: transmitting, to the first UE, a DCI message over a uU channel between the first UE and the base station indicating the request.

Aspect 21: The method of any of aspects 14 through 20, further comprising: identifying, based at least in part on the layer one uplink control message, one or more instances of CSI for the sidelink channel between the first UE and the second UE.

Aspect 22: The method of aspect 21, further comprising: transmitting a separate request for each instance of the CSI for the sidelink channel; and receiving, according to each separate request, a separate layer one uplink control message indicating the requested CSI.

Aspect 23: The method of any of aspects 21 through 22, further comprising: transmitting a common request for each instance of the CSI for the sidelink channel; and receiving, according to the common request, one layer one uplink control message indicating the one or more instances of CSI.

Aspect 24: The method of any of aspects 14 through 23, wherein the layer one uplink control message comprises an uplink control information message carried over a PUCCH message, an PUSCH message, or both.

Aspect 25: An apparatus for wireless communication at a first UE, comprising a processor; memory coupled with the processor; and instructions stored in the memory and executable by the processor to cause the apparatus to perform a method of any of aspects 1 through 13.

Aspect 26: An apparatus for wireless communication at a first UE, comprising at least one means for performing a method of any of aspects 1 through 13.

Aspect 27: A non-transitory computer-readable medium storing code for wireless communication at a first UE, the code comprising instructions executable by a processor to perform a method of any of aspects 1 through 13.

Aspect 28: An apparatus for wireless communication at a base station, comprising a processor; memory coupled with the processor; and instructions stored in the memory and executable by the processor to cause the apparatus to perform a method of any of aspects 14 through 24.

Aspect 29: An apparatus for wireless communication at a base station, comprising at least one means for performing a method of any of aspects 14 through 24.

Aspect 30: A non-transitory computer-readable medium storing code for wireless communication at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving control signaling comprising an indication of a Uu format for a channel state information report indicating channel state information for a sidelink channel between the first UE and a second UE;
   determining the channel state information for the sidelink channel between the first UE and the second UE;
   configuring a layer one uplink control message to indicate the channel state information report according to the Uu format; and
   transmitting, based at least in part on the Uu format, the layer one uplink control message indicating the channel state information report and an identifier of the second UE.

2. The method of claim 1, wherein the Uu format the identifier of the second UE, a subchannel index associated with the sidelink channel between the first UE and the second UE, a channel state information quantity associated with the channel state information, or combinations thereof.

3. The method of claim 1, further comprising:
   identifying, based at least in part on the control signaling, sidelink resources, Uu resources, or both, allocated to the second UE for reference signal transmissions; and
   monitoring for the reference signal transmissions from the second UE using the sidelink resources, the Uu resources, or both, wherein determining the channel state information is based at least in part on the monitoring.

4. The method of claim 1, further comprising:
   receiving a trigger signal from the second UE triggering reference signal transmissions, wherein the trigger signal indicates a cell identifier associated with a network device and the channel state information is determined based at least in part on the trigger signal.

5. The method of claim 1, further comprising:
   determining channel state information for each sidelink channel between the first UE and a corresponding plurality of second UEs, wherein the layer one uplink control message indicates the channel state information for each sidelink channel.

6. The method of claim 1, further comprising:
   receiving a request from a network device triggering transmission of the channel state information report.

7. The method of claim 6, further comprising:
   transmitting, based at least in part on the request, a layer two message to the second UE triggering reference signal transmissions, wherein the channel state information is determined based at least in part on the reference signal transmissions.

8. The method of claim 7, further comprising:
   receiving, from the network device, a downlink control information message over a Uu channel between the first UE and the network device indicating the request.

9. The method of claim 7, further comprising:
   receiving, from the second UE relayed from the network device, a downlink control information over the sidelink channel between the first UE and the network device indicating the request.

10. The method of claim 1, further comprising:
    compiling one or more instances of channel state information for the sidelink channel between the first UE and the second UE, wherein the layer one uplink control message comprises the one or more instances of channel state information.

11. The method of claim 10, further comprising:
receiving a separate request for each instance of the channel state information for the sidelink channel; and
transmitting, according to each separate request, a separate layer one uplink control message indicating the requested channel state information.

12. The method of claim 10, further comprising:
receiving a common request for each instance of the channel state information for the sidelink channel; and
transmitting, according to the common request, one layer one uplink control message indicating the one or more instances of channel state information.

13. The method of claim 1, wherein the layer one uplink control message comprises an uplink control information message carried over a physical uplink control channel (PUCCH) message, a physical uplink shared channel (PUSCH) message, or both.

14. A method for wireless communication at a network device, comprising:
transmitting, to a first user equipment (UE), control signaling comprising an indication of a Uu format for a channel state information report indicating channel state information for a sidelink channel between the first UE and a second UE;
receiving, based at least in part on the Uu format, a layer one uplink control message from the first UE indicating the channel state information report and an identifier of the second UE; and
determining the channel state information for the sidelink channel between the first UE and the second UE based at least in part on the channel state information report.

15. The method of claim 14, wherein the Uu format comprises the identifier of the second UE, a subchannel index associated with the sidelink channel between the first UE and the second UE, a channel state information quantity associated with the channel state information, or combinations thereof.

16. The method of claim 14, further comprising:
configuring the control signaling to indicate sidelink resources, Uu resources, or both, allocated to the second UE for reference signal transmissions, wherein the second UE performs the reference signal transmissions using the sidelink resources, the Uu resources, or both.

17. The method of claim 14, further comprising:
transmitting a trigger signal to the second UE triggering reference signal transmissions, wherein the trigger signal indicates a cell identifier associated with the network device and the channel state information is based at least in part on the trigger signal.

18. The method of claim 14, further comprising:
determining, based at least in part on the layer one uplink control message, the channel state information for each sidelink channel between the first UE and a corresponding plurality of second UEs, wherein the layer one uplink control message indicates the channel state information for each sidelink channel.

19. The method of claim 14, further comprising:
transmitting a request triggering the channel state information report.

20. The method of claim 19, further comprising:
transmitting, to the first UE, a downlink control information message over a Uu channel between the first UE and the network device indicating the request.

21. The method of claim 20, further comprising:
transmitting, to the second UE for relaying to the first UE, a downlink control information over a Uu channel between the second UE and the network device indicating the request.

22. The method of claim 14, further comprising:
identifying, based at least in part on the layer one uplink control message, one or more instances of channel state information for the sidelink channel between the first UE and the second UE.

23. The method of claim 22, further comprising:
transmitting a separate request for each instance of the channel state information for the sidelink channel; and
receiving, according to each separate request, a separate layer one uplink control message indicating the requested channel state information.

24. The method of claim 22, further comprising:
transmitting a common request for each instance of the channel state information for the sidelink channel; and
receiving, according to the common request, one layer one uplink control message indicating the one or more instances of channel state information.

25. The method of claim 14, wherein the layer one uplink control message comprises an uplink control information message carried over a physical uplink control channel (PUCCH) message, a physical uplink shared channel (PUSCH) message, or both.

26. An apparatus for wireless communication at a first user equipment (UE), comprising:
a processor;
memory coupled with the processor; and
instructions stored in the memory and executable by the processor to cause the apparatus to:
receive control signaling comprising an indication of a Uu format for a channel state information report indicating channel state information for a sidelink channel between the first UE and a second UE;
determine the channel state information for the sidelink channel between the first UE and the second UE;
configure a layer one uplink control message to indicate the channel state information report according to the Uu format; and
transmit, based at least in part on the Uu format, the layer one uplink control message to a base station indicating the channel state information report and an identifier of the second UE.

27. The apparatus of claim 26, wherein the Uu format comprises the identifier of the second UE, a subchannel index associated with the sidelink channel between the first UE and the second UE, a channel state information quantity associated with the channel state information, or combinations thereof.

28. The apparatus of claim 26, wherein the instructions are further executable by the processor to cause the apparatus to:
identify, based at least in part on the control signaling, sidelink resources, Uu resources, or both, allocated to the second UE for reference signal transmissions; and
monitor for the reference signal transmissions from the second UE using the sidelink resources, the Uu resources, or both, wherein determining the channel state information is based at least in part on the monitoring.

29. An apparatus for wireless communication at a network device, comprising:
a processor;
memory coupled with the processor; and instructions stored in the memory and executable by the processor to cause the apparatus to:
- transmit, to a first user equipment (UE), control signaling comprising an indication of a Uu format for a channel state information report indicating channel state information for a sidelink channel between the first UE and a second UE;
- receive, based at least in part on the Uu format, a layer one uplink control message from the first UE indicating the channel state information report and an identifier of the second UE; and
- determine the channel state information for the sidelink channel between the first UE and the second UE based at least in part on the channel state information report.

30. The apparatus of claim 29, wherein the comprises the identifier of the second UE, a subchannel index associated with the sidelink channel between the first UE and the second UE, a channel state information quantity associated with the channel state information, or combinations thereof.

* * * * *